US012764798B2

(12) United States Patent
Xing et al.

(10) Patent No.: US 12,764,798 B2
(45) Date of Patent: Oct. 13, 2026

(54) INFORMATION INDICATION METHOD AND APPARATUS

(71) Applicant: Huawei Technologies Co., Ltd., Shenzhen (CN)

(72) Inventors: Shuangshuang Xing, Shenzhen (CN); Yiqun Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 784 days.

(21) Appl. No.: 17/738,213

(22) Filed: May 6, 2022

(65) Prior Publication Data

US 2022/0272771 A1 Aug. 25, 2022

Related U.S. Application Data

(63) Continuation of application No. PCT/CN2019/116875, filed on Nov. 8, 2019.

(51) Int. Cl.
*H04W 74/0833* (2024.01)
*H04L 1/1812* (2023.01)
(Continued)

(52) U.S. Cl.
CPC ....... *H04W 74/0841* (2013.01); *H04L 1/1812* (2013.01); *H04L 5/0053* (2013.01);
(Continued)

(58) Field of Classification Search
CPC ... H04L 1/1854; H04L 1/1812; H04L 5/0053; H04L 27/26025; H04L 5/0055;
(Continued)

(56) References Cited

U.S. PATENT DOCUMENTS

2018/0323920 A1 11/2018 Zhu et al.
2019/0222400 A1 7/2019 Bagheri et al.
(Continued)

FOREIGN PATENT DOCUMENTS

CN 101616443 A 12/2009
CN 109495975 A 3/2019
(Continued)

OTHER PUBLICATIONS

"Correction on Determination of the Resource Allocation Table for PUSCH with SP CSI," Source to WG: Huawei, HiSilicon, Source to TG: R1, Work Item Code: NR_newRAT-Core, Date: Feb. 27, 2019, Category: F, Release: Rel-15, Change Request 38.214, CR 0011, rev—Current Version: 15.4.0, 3GPP TSG RAN WG1 Meeting #96, R1-1903557 (Revision of R1-1901618), Feb. 25-Mar. 1, 2019, 2 pages.

(Continued)

*Primary Examiner* — Huy D Vu
*Assistant Examiner* — Bao G Nguyen
(74) *Attorney, Agent, or Firm* — Slater Matsil, LLP

(57) ABSTRACT

A system and method for communicating hybrid automatic repeat request (HARQ) acknowledgement information, the method including receiving, by a terminal device, a physical downlink shared channel (PDSCH) that carries a random access response, the random access response including a physical uplink control channel (PUCCH) resource indicator and a PDSCH-to-hybrid automatic repeat request feedback (PDSCH-to-HARQ_feedback) timing indicator, where the PUCCH resource indicator is associated with determination of a frequency domain resource for feeding back HARQ acknowledgement information, and the PDSCH-to-HARQ_feedback timing indicator is associated with determination of a time domain resource for feeding back the HARQ acknowledgement information, and sending, by the terminal
(Continued)

device, the HARQ acknowledgement information on the frequency domain resource and the time domain resource, wherein a sending slot is related to an uplink slot corresponding to the last symbol of the PDSCH, an offset indicated by the PDSCH-to-HARQ_feedback timing indicator, and value associated with subcarrier spacing.

12 Claims, 7 Drawing Sheets

(51) Int. Cl.

| | |
|---|---|
| ***H04L 5/00*** | (2006.01) |
| ***H04L 27/26*** | (2006.01) |
| ***H04W 72/0446*** | (2023.01) |
| ***H04W 72/0453*** | (2023.01) |
| ***H04W 72/1273*** | (2023.01) |
| ***H04W 74/08*** | (2009.01) |
| *H04W 74/0836* | (2024.01) |

(52) U.S. Cl.
CPC ... *H04L 27/26025* (2021.01); *H04W 72/0446* (2013.01); *H04W 72/0453* (2013.01); *H04W 72/1273* (2013.01); *H04W 74/0833* (2013.01); *H04W 74/0866* (2013.01); *H04W 74/0836* (2024.01)

(58) Field of Classification Search
CPC ......... H04W 72/1273; H04W 74/0866; H04W 56/0045; H04W 72/0446; H04W 74/0841; H04W 74/0833; H04W 72/0453
See application file for complete search history.

(56) References Cited

U.S. PATENT DOCUMENTS

| | | | | |
|---|---|---|---|---|
| 2020/0267775 | A1 | 8/2020 | Wang et al. | |
| 2021/0022187 | A1 | 1/2021 | Xu et al. | |
| 2021/0218539 | A1* | 7/2021 | Hu | H04L 1/1861 |
| 2022/0217641 | A1* | 7/2022 | Lee | H04W 52/50 |
| 2022/0368468 | A1* | 11/2022 | Xiong | H04W 76/27 |
| 2022/0408429 | A1* | 12/2022 | Choi | H04L 1/1812 |

FOREIGN PATENT DOCUMENTS

| | | | | |
|---|---|---|---|---|
| CN | 109756991 | A | | 5/2019 |
| CN | 110351878 | A | | 10/2019 |
| KR | 10-2019-0120135 | | * | 9/2019 |

OTHER PUBLICATIONS

Feature Lead Summary#5 on 2 Step RACH Procedures, Agenda Item: 7.2.1.2, Source: Nokia, Nokia Shanghai Bell, Document for: Discussion and Decision, 3GPP TSG RAN WG1 #98bis, R1-1911599, Oct. 14-18, 2019, 64 pages.
"New msgB Formats for 2-Step RA," Agenda Item: 6.13.2, Source: Ericsson, Document for: Discussion, Decision, 3GPP TSG-RAN WG2 #108, R2-1915603, Nov. 18-22, 2019, 6 pages.
"On Enhancements to UCI for eURLLC," Source: Intel Corporation, Agenda Item: 7.2.6.2, Document for: Discussion and Decision, 3GPP TSG RAN WG1 #97, R1-1906807, Reno, USA, May 13-17, 2019, 11 pages.
"UCI Enhancements for URLLC," Source: CAICT, Agenda Item: 7.2.6.2, Document for: Discussion/Decision, 3GPP TSG RAN WG1 Meeting #37, R1-1907203, Reno, USA, May 13-17, 2019, 8 pages.
"Email Discussion [98-NR-08] on HARQ-ACK Related Issues for MsgB," Agenda Item: 7.2.1.2, Source: Nokia, Nokia Shanghai Bell, Document for: Discussion and Decision, 3GPP TSG-WG1 Meeting #98bis, R1-1910692, Chongqing, China, Oct. 14-20, 2019, 19 pages.
"3rd Generation Partnership Project; Technical Specification Group Radio Access Network; Evolved Universal Terrestrial Radio Access (E-UTRA); Physical layer; Measurements (Release 15)," 3GPP TS 36.214 V15.4.0, Sep. 2019, 25 pages.
"3rd Generation Partnership Project; Technical Specification Group Radio Access Network; NR; Physical channels and modulation (Release 15)," 3GPP TS 38.211 V15.7.0, Sep. 2019, 97 pages.
"3rd Generation Partnership Project; Technical Specification Group Radio Access Network; NR; Physical layer procedures for control (Release 15)," 3GPP TS 38.213 V15.7.0, Sep. 2019, 108 pages.
"3rd Generation Partnership Project; Technical Specification Group Radio Access Network; NR; Physical layer procedures for data (Release 15)," 3GPP TS 38.214 V15.7.0, Sep. 2019, 106 pages.
"3rd Generation Partnership Project; Technical Specification Group Radio Access Network; NR; Medium Access Control (MAC) protocol specification (Release 15)," 3GPP TS 38.321 V15.7.0, Sep. 2019, 78 pages.
"NR Two-Step Random Access Procedure," Agenda Item: 5.1.1.4.3, Source: Ericsson, Document for: Discussion, Decision, 3GPP TSG-RAN WG1 NR adhoc, R1-1700300, Spokane, USA, Jan. 16-20, 2017, 4 pages.
"Remaining Issues of 2-step RACH Procedures," Source: ZTE, Sanechips, Agenda Item: 7.2.1.2, Document for: Discussion, 3GPP TSG RAN WG1 Meeting #98bis, R1-1910003, Chongqing, China, Oct. 14-20, 2019, 19 pages.
"Remaining Details of 2-step RACH Procedure," Agenda item: 7.2.1.2, Source: Nokia, Nokia Shanghai Bell, Document for: Discussion and Decision, 3GPP TSG RAN WG1 #98bis, R1-1910689, Chongqing, China, Oct. 14-18, 2019, 31 pages.
"Msg3 Buffer Handling for EDT in 36.321,"Source to WG: Huawei, HISilicon, Nokia, Nokia Shanghai Bell, Source to TSG: R2, Work item code: NB_IOTenh2-Core, LTE_eMTC4-Core, Date: Oct. 10, 2018, Category: F, Release: Rel-15, Change Request, 36.321, CR 1384, Current version: 15.2.0, 3GPP TSG-RAN WG2 Meeting #103bis, R2-1816021, Chengdu, China, Oct. 8-12, 2018, 9 pages.
"New Work item: 2-step RACH for NR," Source: ZTE Corporation, Sanechips, Document for: Approval, Agenda Item: 9.1.1, 3GPP TSG RAN Meeting #82, RP-182894, Sorrento, Italy, Dec. 10-13, 2018, 5 pages.
3GPP TSG RAN WG1 #98bis, R1-1910199, Discussion on 2-step RACH procedure, vivo, Chongqing, China, Oct. 4, 2019, total 8 pages.
3GPP TSG-RAN WG1 Meeting #92bis, R1-1805540, Summary of DL/UL scheduling and HARQ management, Qualcomm Incorporated, Sanya, China, Apr. 18, 2018, total 25 pages.
Ericsson et al: "Correction for applicable scope of the additional subcarrier spacing specific slot delay," 3GPP Draft; R1-1814221 Correction for Applicable Scope of Theadditional Subcarrier Spacing Specific Slot Delay (Update OFR1-1814059), 3rd Generation Partnership Project (3GPP), Mobile Competence CEN vol. RAN WG1, No. Spokane, USA, Nov. 12-Nov. 16, 2018, Nov. 19, 2018, (Nov. 19, 2018), XP051490342, total 3 pages.
Motorola Mobility, Lenovo: "2-step RACH procedure," 3GPP TSG RAN WG1 #98bis Chongqing, China, Oct. 14-20, 2019, R1-1911035, total 6 pages.

* cited by examiner

INFORMATION INDICATION METHOD AND APPARATUS

CROSS-REFERENCE TO RELATED APPLICATIONS

This application is a continuation of International Application No. PCT/CN2019/116875, filed on Nov. 8, 2019, the disclosure of which is hereby incorporated by reference in its entirety.

TECHNICAL FIELD

This application relates to the field of communications technologies, and in particular, to an information indication method and an apparatus.

In a long term evolution (LTE) communications system, before transmitting uplink data, a terminal device in an idle state or an inactive state usually needs to complete four times of information exchange to enter a radio resource control (RRC) connected state. Further, after entering the RRC connected state, the terminal device can communicate with a network device.

However, in a method in which the terminal device and the network device exchange information four times, a relatively high latency is usually generated. Therefore, a 2-step random access procedure is proposed in the industry. Step 1: The terminal device sends both a random access preamble and data in Step 1. Step 2: The network device sends a random access response to the terminal device. After the terminal device receives the random access response, the terminal device may send, on an obtained time-frequency resource carrying a hybrid automatic repeat request (HARQ)-acknowledgement (ACK), the HARQ-ACK to the network device.

Therefore, how the terminal device obtains the time-frequency resource carrying the HARQ-ACK is a problem to be urgently resolved.

SUMMARY so that a terminal device can obtain a time-frequency resource used to carry HARQ acknowledgement information. Further, a payload size of a random access response can be reduced. The random access response includes information used to indicate the time-frequency resource carrying the HARQ acknowledgement information.

According to a first aspect, this application provides an information indication method. The method includes: A terminal device receives a random access response from a network device, where the random access response includes a first radio network temporary identifier (RNTI), the first RNTI includes a first field and a second field, the first field is used to indicate a first frequency domain resource, and the second field is used to indicate a first time domain resource; and the terminal device sends hybrid automatic repeat request HARQ acknowledgement information based on the first time domain resource and the first frequency domain resource.

In this embodiment of this application, the terminal device not only obtains a time-frequency resource used to carry the HARQ acknowledgement information, but also shares the first RNTI, so that signaling overheads are reduced, and a payload size of the random access response sent by the network device is reduced.

In a possible implementation, a value of the first RNTI is obtained based on an N-ary value corresponding to a bit length i of the first field and an N-ary value corresponding to a bit length j of the second field, and the N-ary value includes any one of a decimal value, an octal value, and a hexadecimal value.

In a possible implementation, the value of the first RNTI satisfies the following condition:

$$o < D_1 \le \text{First threshold, and } D_1 \ne D_2\text{; and}$$

$$D_1 = C * 2^{i+j} + A * 2^j + B \text{ or } D_1 = C * 2^{i+j} + B * 2^i + A$$

where $D_1$ is the value of the first RNTI, $D_2$ is a value of a second RNTI, i is the bit length of the first field, j is the bit length of the second field, A is a decimal value of i bits, B is a decimal value of j bits, C is a decimal value of k bits, i+j+k=L, and L is a bit length of the first RNTI.

In a possible implementation, the value of the first RNTI further satisfies the following condition:

$$\text{Second threshold} < D_1 \le \text{First threshold.}$$

In a possible implementation, the value of the first RNTI satisfies the following condition:

$$o < D_1 \le \text{First threshold, and } D_1 \ne D_2\text{; and}$$

$$D_1 = A * 2^{j+k} + B * 2^k + C \text{ or } D_1 = B * 2^{i+k} + A * 2^k + C,$$

where $D_1$ is the value of the first RNTI, $D_2$ is a value of a second RNTI, i is the bit length of the first field, j is the bit length of the second field, A is a decimal value of i bits, B is a decimal value of j bits, C is a decimal value of k bits, i+j+k=L, and L is a bit length of the first RNTI.

In a possible implementation, a slot in which the terminal device sends the HARQ acknowledgement information to the network device satisfies the following condition:

$$n_{PUCCH} = n_{TA} + n_B\text{; or}$$

$$n_{PUCCH} = n + k_{TA} + n_B\text{; or}$$

$$n_{PUCCH} = \max\{n + n_B,\ n + k_{TA} + 1\},$$

where $n_{PUCCH}$ is the slot in which the terminal device sends the HARQ acknowledgement information, $n_{TA}$ is a slot in which a timing advance command takes effect, n is an uplink slot corresponding to the last symbol of a physical downlink shared channel (physical downlink shared channel, PDSCH), $k_{TA}$ is a timing advance (time advance, TA) adjustment parameter, the PDSCH carries the random access response, and $n_B$ is a specific value whose index is B in a preconfigured value set.

According to a second aspect, this application provides an information indication method. The method includes: A network device receives a random access request from a terminal device; and the network device sends a random access response to the terminal device, where the random access response includes a first radio network temporary identifier RNTI, the first RNTI includes a first field and a second field, the first field is used to indicate a first frequency domain resource, the second field is used to indicate a first time domain resource, the first frequency domain resource and the first time domain resource are used to indicate a time-frequency resource for hybrid automatic repeat request HARQ acknowledgement information, and the HARQ acknowledgement information is used to feed back that the random access response is correctly received.

In a possible implementation, a value of the first RNTI is obtained based on an N-ary value corresponding to a bit length i of the first field and an N-ary value corresponding to a bit length j of the second field, and the N-ary value includes any one of a decimal value, an octal value, and a hexadecimal value.

In a possible implementation, the value of the first RNTI satisfies the following condition:

$$o < D_1 \leq \text{First threshold, and } D_1 \neq D_2\text{; and}$$

$$D_1 = C*2^{i+j} + A*2^j + B \text{ or } D_1 = C*2^{i+j} + B*2^i + A,$$

where $D_1$ is the value of the first RNTI, $D_2$ is a value of a second RNTI, i is the bit length of the first field, j is the bit length of the second field, A is a decimal value of i bits, B is a decimal value of j bits, C is a decimal value of k bits, i+j+k=L, and L is a bit length of the first RNTI.

In a possible implementation, the value of the first RNTI further satisfies the following condition:

$$\text{Second threshold} < D_1 \leq \text{First threshold.}$$

In a possible implementation, the value of the first RNTI satisfies the following condition:

$$o < D_1 \leq \text{First threshold, and } D_1 \neq D_2\text{; and}$$

$$D_1 = A*2^{j+k} + B*2^k + C \text{ or } D_1 = B*2^{i+k} + A*2^k + C,$$

where $D_1$ is the value of the first RNTI, $D_2$ is a value of a second RNTI, i is the bit length of the first field, j is the bit length of the second field, A is a decimal value of i bits, B is a decimal value of j bits, C is a decimal value of k bits, i+j+k=L, and L is a bit length of the first RNTI.

In a possible implementation, a slot in which the terminal device sends the HARQ acknowledgement information to the network device satisfies the following condition:

$$n_{PUCCH} = n_{TA} + n_B\text{; or}$$

$$n_{PUCCH} = n + k_{TA} + n_B\text{; or}$$

$$n_{PUCCH} = \max\{n + n_B,\ n + k_{TA} + 1\},$$

where $n_{PUCCH}$ is an uplink slot in which the terminal device sends the HARQ acknowledgement information, $n_{TA}$ is a slot in which a timing advance command takes effect, n is an uplink slot corresponding to the last symbol of a PDSCH, the PDSCH carries the random access response, $k_{TA}$ is a timing advance (TA) adjustment parameter, the PDSCH is used to transmit the random access response, and $n_B$ is a specific value whose index is B in a preconfigured value set.

According to a third aspect, this application provides an information indication method. The method includes: A terminal device receives a random access response from a network device, where the random access response includes indication information, and the indication information is used to indicate a first frequency domain resource and a first time domain resource; and the terminal device sends hybrid automatic repeat request HARQ acknowledgement information based on the first time domain resource and the first frequency domain resource, where a sending slot of the HARQ acknowledgement information is related to a slot in which a timing advance command takes effect.

In this embodiment of this application, the sending slot of the HARQ acknowledgement information is associated with the slot in which the timing advance command takes effect, to ensure validity of sending, by the terminal device, a physical uplink control channel (PUCCH) that carries the HARQ acknowledgement information, so that the network device can correctly detect the physical uplink control channel (PUCCH).

In a possible implementation, the random access response further includes the timing advance command; and the indication information and the timing advance command are carried on a same physical downlink shared channel (PDSCH); or the timing advance command is carried in downlink control information (DCI), and the indication information is carried on a PDSCH scheduled by using the DCI; or the indication information and the timing advance command are carried in same DCI.

In a possible implementation, the slot in which the terminal device sends the HARQ acknowledgement information to the network device satisfies the following condition:

$$n_{PUCCH} = n_{TA} + n_B\text{; or}$$

$$n_{PUCCH} = n + k_{TA} + n_B\text{; or}$$

$$n_{PUCCH} = \max\{n + n_B,\ n + k_{TA} + 1\},$$

where $n_{PUCCH}$ is the slot in which the terminal device sends the HARQ acknowledgement information, $n_{TA}$ is the slot in which the timing advance command takes effect, n is an uplink slot corresponding to the last symbol of the PDSCH, the PDSCH carries the random access response, $k_{TA}$ is a timing advance adjustment parameter, $n_B$ is a specific value whose index is B in a preconfigured value set, and B is a specific value of a field indicating the first time domain resource.

In a possible implementation, the slot in which the timing advance command takes effect satisfies the following condition:

$$n_{TA\_update} = n + k_{TA} + \Delta\text{; and}$$

the slot in which the terminal device sends the HARQ acknowledgement information to the network device satisfies the following condition:

$$n_{PUCCH} = n_{TA\_update} + n_B\text{; or}$$

$$n_{PUCCH} = n + k_{TA} + n_B\text{; or}$$

$$n_{PUCCH} = \max\{n + n_B,\ n_{TA\_update}\}\text{; or}$$

$$n_{PUCCH} = n + n_B,$$

where Δ is a constant, $n_{PUCCH}$ is the slot in which the terminal device sends the HARQ acknowledgement information, $n_{TA\_update}$ is the slot in which the timing advance command takes effect, n is an uplink slot corresponding to the last symbol of the PDSCH, the PDSCH carries the random access response, $k_{TA}$ is a timing advance adjustment parameter, $n_B$ is a specific value whose index is B in a preconfigured value set, and B is a specific value of a field indicating the first time domain resource.

According to a fourth aspect, this application provides a communications apparatus. The communications apparatus includes a receiving unit and a sending unit, and the receiving unit is configured to perform the method according to the first aspect and/or the method according to the third aspect.

According to a fifth aspect, this application provides a communications apparatus. The communications apparatus includes a receiving unit and a sending unit, and the receiving unit is configured to perform the method according to the second aspect.

According to a sixth aspect, this application provides a communications apparatus. The communications apparatus includes a processor. When the processor executes a computer program or instructions in a memory, the method according to the first aspect and/or the method according to the third aspect are/is performed.

According to a seventh aspect, this application provides a communications apparatus. The communications apparatus includes a processor. When the processor invokes a computer program or instructions in a memory, the method according to the second aspect is performed.

According to an eighth aspect, this application provides a communications apparatus. The communications apparatus includes a processor and a memory. The memory is configured to store computer-executable instructions, and the processor is configured to execute the computer-executable instructions stored in the memory, to enable the communications apparatus to perform the method according to the first aspect and/or the method according to the third aspect.

According to a ninth aspect, this application provides a communications apparatus. The communications apparatus includes a processor and a memory. The memory is configured to store computer-executable instructions, and the processor is configured to execute the computer-executable instructions stored in the memory, to enable the communications apparatus to perform the method according to the second aspect.

According to a tenth aspect, this application provides a communications apparatus. The communications apparatus includes a processor, a memory, and a transceiver. The transceiver is configured to receive a signal or send a signal, the memory is configured to store program code, and the processor is configured to execute the program code, to enable the communications apparatus to perform the method according to the first aspect and/or the method according to the third aspect.

According to an eleventh aspect, this application provides a communications apparatus. The communications apparatus includes a processor, a memory, and a transceiver. The transceiver is configured to receive a signal or send a signal, the memory is configured to store program code, and the processor is configured to execute the program code, to enable the communications apparatus to perform the method according to the second aspect.

According to a twelfth aspect, this application provides a communications apparatus. The communications apparatus includes a processor and an interface circuit. The interface circuit is configured to receive code instructions and transmit the code instructions to the processor, and the processor runs the code instructions to perform the corresponding method according to the first aspect and/or the corresponding method according to the third aspect.

According to a thirteenth aspect, this application provides a communications apparatus. The communications apparatus includes a processor and an interface circuit. The interface circuit is configured to receive code instructions and transmit the code instructions to the processor, and the processor runs the code instructions to perform the corresponding method according to the second aspect.

According to a fourteenth aspect, this application provides a communications system. The communications system includes a terminal device and a network device. The terminal device is configured to perform the method according to the first aspect, and the network device is configured to perform the method according to the second aspect; or the terminal device may be configured to perform the method according to the third aspect.

According to a fifteenth aspect, this application provides a computer-readable storage medium. The computer-readable storage medium is configured to store instructions or a computer program; and when the instructions are executed or the computer program is executed, the method according to the first aspect and/or the method according to the third aspect are/is implemented.

According to a sixteenth aspect, this application provides a computer-readable storage medium. The computer-readable storage medium is configured to store instructions or a computer program; and when the instructions are executed or the computer program is executed, the method according to the second aspect is implemented.

According to a seventeenth aspect, this application provides a computer program product. The computer program product includes instructions or a computer program; and when the instructions are executed or the computer program is executed, the method according to the first aspect and/or the method according to the third aspect are/is implemented.

According to an eighteenth aspect, this application provides a computer program product. The computer program product includes instructions or a computer program; and when the instructions are executed or the computer program is executed, the method according to the second aspect is implemented.

DETAILED DESCRIPTION OF ILLUSTRATIVE EMBODIMENTS

In the specification, the claims, and the accompanying drawings of this application, the terms "first", "second", "third", "fourth" and the like are intended to distinguish between different objects but do not indicate a particular order. In addition, the terms "including", "having", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

In this application, "at least one (item)" means one or more, "a plurality of" means two or more, and "at least two (items)" means two or more than three (including three). The term "and/or" is used to describe an association relationship for describing associated objects and represents that three relationships may exist. For example, "A and/or B" may represent the following three cases: Only A exists, only B exists, and both A and B exist, where A and B may be singular or plural. The character "/" usually represents an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

Figure 1:
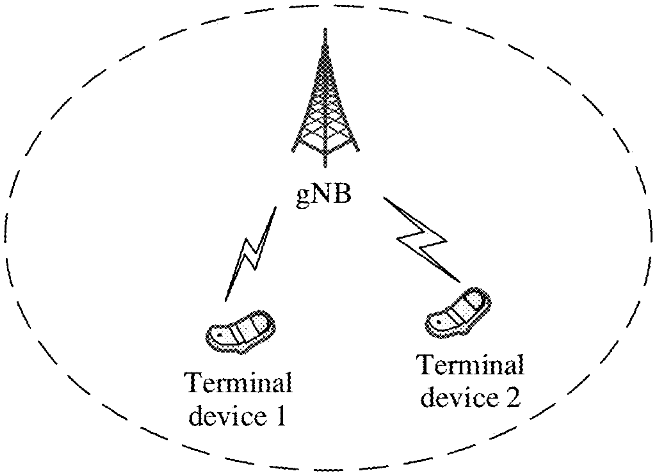
FIG. 1 is a schematic architectural diagram of a communications system according to an embodiment of this application.

A communications system that this application uses may be understood as a wireless cellular communications system, or understood as a wireless communications system based on a cellular network architecture. Methods provided in this application may be applied to various communications systems, for example, an internet of things (IoT) system, a narrowband internet of things (NB-IoT) system, or a long term evolution (LTE) system, or a 5th generation (5th-generation, 5G) communications system, or an LTE and 5G hybrid architecture system, or a 5G new radio (NR) system, and a new communications system (such as $6^{th}$ generation (6G)) that will emerge in the development of future communications. The method provided in the embodiments of this application may be used provided that HARQ acknowledgement information needs to be fed back in a communications system. In an example, FIG. 1 is a schematic diagram of a communications system according to an embodiment of this application. The solutions in this application are applicable to the communications system. The communications system may include at least one network device, where only one network device, for example, a base station (the next generation Node B, gNB) in FIG. 1, is shown, and one or more terminal devices connected to the network device, for example, a terminal device 1 and a terminal device 2 in FIG. 1.

The network device may be a device that can communicate with the terminal device. The network device may be any device that has a wireless transceiver function, and includes but is not limited to a base station. For example, the base station may be a gNB, or the base station is a base station in a future communications system. Optionally, the network device may alternatively be an access node, a wireless relay node, a wireless backhaul node, or the like in a wireless local area network (WLAN, WiFi) system. Optionally, the network device may alternatively be a radio controller in a cloud radio access network (CRAN) scenario. Optionally, the network device may alternatively be a wearable device, a vehicle-mounted device, or the like. Optionally, the network device may alternatively be a small cell, a transmission node (TRP) (which may also be referred to as a transmission reception point, or the like), or the like. It may be understood that the base station may alternatively be a base station in a future evolved public land mobile network (PLMN) or the like.

The terminal device may also be referred to as user equipment (UE), a terminal, or the like. The terminal device is a device having a wireless transceiver function, and may be deployed on land, including an indoor, outdoor, handheld, wearable, or vehicle-mounted device; may be deployed on a water surface, for example, on a ship; or may be deployed in the air, for example, on an aerocraft, a balloon, or a satellite. The terminal device may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. It may be understood that the terminal device may alternatively be a terminal device in a future 6G network, a terminal device in a future evolved PLMN, or the like.

It may be understood that FIG. 1 is merely an example for description, and a quantity of terminal devices, a quantity of network devices, and a quantity of cells served by a network device that are included in the communications system are not specifically limited.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may learn that: With evolution of the network architecture and emergence of a new service scenario, the technical solutions provided in the embodiments of this application are also applicable to a similar technical problem.

Further, in the communications system shown in FIG. 1, the terminal device 1 and the terminal device 2 may also communicate with each other by using a device-to-device (D2D) technology, a vehicle-to-everything (V2X) technology, a machine-to-machine (M2M) technology, or the like. A method for communication between the terminal device 1 and the terminal device 2 is not limited in this embodiment of this application.

It should be noted that the communications system in FIG. 1 may be applied to a communication scenario in another embodiment of this application. Details are not described herein. For example, the network device and the terminal device 1 may be configured to perform an information indication method shown in FIG. 5 and/or an information indication method shown in FIG. 8. For another example, the network device and the terminal device 2 may be configured to perform an information indication method shown in FIG. 5 and/or an information indication method shown in FIG. 8.

The following describes a 4-step random access method and a 2-step random access method in the embodiments of this application.

Figure 2:
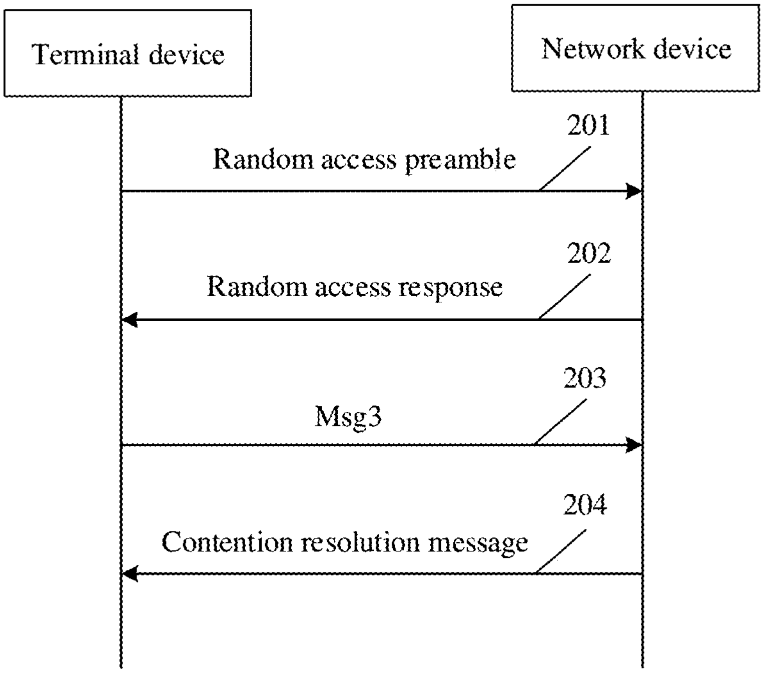
FIG. 2 is a schematic flowchart of 4-step random access according to an embodiment of this application.

Currently, in wireless communications systems such as LTE and 5G, a terminal device usually needs to perform 4-step random access, as shown in FIG. 2.

201: UE sends a random access preamble to a base station, where the random access preamble may also be referred to as a first message (Msg1). A function of the random access preamble is to notify the base station that there is a random access request, so that the base station can estimate a transmission latency between the base station and the UE. In this way, the base station calibrates an uplink timing, and notifies the UE of calibration information by using a timing advance command.

202: After detecting the random access preamble, the base station sends a random access response to the UE, where the random access response may also be referred to as a second message (Msg2). The random access response may include a sequence number of the random access preamble received in step 201, the timing advance command, uplink resource allocation information, a temporary cell radio network temporary identifier (TC-RNTI), and the like.

203: The UE receives the random access response. If a random access preamble indicated by the sequence number of the random access preamble in the random access response is the same as the random access preamble sent by the UE to the base station in step 201, the UE considers that the random access response is a random access response for the UE, that is, the UE receives the random access response for the UE. After receiving the random access response, the UE sends an uplink message on an uplink resource indicated by the random access response, for example, sends uplink data on a physical uplink shared channel (physical uplink shared channel, PUSCH), where the uplink message is also referred to as a third message (Msg3). The Msg3 may carry a unique user identifier.

204: The base station receives the uplink message of the UE, and returns a contention resolution message to the UE that performs successful access, where the contention resolution message is also referred to as a fourth message (Msg4). The base station includes the unique user identifier in the Msg3 in the contention resolution message to indicate the UE that performs successful access. Other UE that fails in access initiates random access again.

For a 4-step random access procedure, when the UE in an idle state or an inactive state intends to perform uplink data transmission, the UE needs to first complete the foregoing four times of information exchange to enter an RRC connected state. However, with rapid development of ultra-reliable and low-latency communication (ultra reliable low latency, URLLC), machine type communication (MTC), and an internet of things (IoT) in the future, there are an increasing quantity of application scenarios for sparse-required data transmission, small packet-required data transmission, and low latency-required data transmission. Consequently, the conventional 4-step RACH becomes a technical bottleneck due to a latency caused by multi-step interaction between the UE and the base station to satisfy transmission of such a data service.

Figure 3:
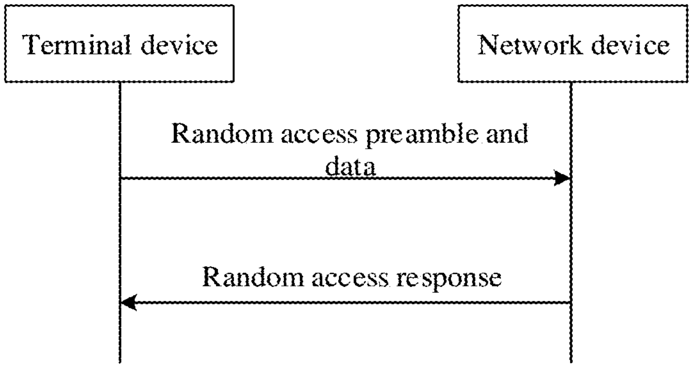
FIG. 3 is a schematic flowchart of 2-step random access according to an embodiment of this application.

To reduce an access latency and signaling overheads, a 2-step random access procedure (2-step RACH) is proposed currently. As shown in FIG. 3, UE sends both a random access preamble and data to a base station in Step 1, and the base station sends a random access response to the UE in Step 2. In the 2-step random access procedure, on the one hand, the UE sends the random access preamble and the data in Step 1, so that an uplink data transmission latency can be reduced. On the other hand, the base station does not need to send scheduling information corresponding to a Msg3 to the UE, so that signaling overheads can be reduced. Usually, a MsgA may be used to represent the first exchanged message during 2-step random access. The MsgA is sent by the UE to the base station. The MsgA message includes a MsgA preamble part and a MsgA data part. The preamble part is carried on a MsgA physical random access channel (PRACH) for transmission, and the data part is carried on a MsgA PUSCH for transmission.

Response content of a MsgB may include at least one of a response for the preamble and a response for the PUSCH. In an example, for the 2-step random access procedure, a response message sent by the base station to the UE may include a fallback random access response (RAR) or a success random access response (success RAR). The following separately describes the fallback random access response and the success random access response.

If the base station correctly detects the MsgA PRACH but incorrectly decodes the PUSCH, the base station sends the fallback random access response to the UE. If the base station correctly detects the MsgA PRACH and correctly decodes the PUSCH, the base station sends the success random access response to the UE. The fallback random access response may include: a preamble index (random access preamble index) carried in the MsgA, a timing advance command, a TC-RNTI, and an uplink scheduling grant (UL grant). The success random access response may include: a contention resolution identifier (contention resolution ID, CRID), a C-RNTI, and a timing advance command. Optionally, when the base station correctly detects the MsgA PRACH and correctly decodes the PUSCH, in addition to information included in the success random access response, the base station may further need to send one or more of the following information to the UE: information indicating a resource used to feed back an acknowledgement message, a transmit power control command used to transmit an acknowledgement message, an uplink data transmission grant (UL grant), and an RRC message (for example, radio resource control reconfiguration information, radio resource control connection establishment information, and radio resource control resume information).

Further, when the UE receives the success random access response, for the success random access response, the UE further needs to feed back HARQ acknowledgement information to the base station. When the UE sends the HARQ acknowledgement information to the base station, the UE needs to obtain a time-frequency resource that carries the HARQ acknowledgement information and on which a PUCCH is located. Specifically, the information indicating the resource used to feed back the HARQ acknowledgement information generally includes a PUCCH resource indicator and a PDSCH-to-HARQ_feedback timing indicator (PDSCH-to-HARQ_feedback timing indicator). The UE may determine, based on the PUCCH resource indicator and the PDSCH-to-HARQ_feedback timing indicator, the time-frequency resource carrying a HARQ.

For a method for obtaining, by the UE based on the PUCCH resource indicator, a frequency domain resource used to feed back the HARQ acknowledgement information, refer to a formula (1):

$$r_{PUCCH}=\left\lfloor\frac{2\cdot n_{CCE,0)}}{N_{CCE,0)}}\right\rfloor+2\cdot\Delta_{PRI} \quad (1)$$

$r_{PUCCH}$ is an index number of a PUCCH frequency domain resource in a preset PUCCH frequency domain resource set, and based on the index number, the UE may obtain, according to a preset rule, a frequency domain resource block position/index number used to feed back the HARQ acknowledgement information. $n_{CCE,0}$ is the first control channel element (control channel element, CCE) index number of a PDCCH of a PDSCH in which scheduling response information is located, and $N_{CCE,0}$ is a quantity of CCEs in a control resource set (control resource set, CORESET) of the PDCCH. $\Delta_{PRI}$ is a value of a PUCCH resource indicator field, and generally, the value of the PUCCH resource indicator field is {0 to 7}.

For a method for obtaining, by the UE based on the PDSCH-to-HARQ_feedback timing indicator, a time domain resource used to feed back the HARQ acknowledgement information, refer to a formula (2):

$$n_{PUCCH}=n+n_B \quad (2)$$

That is, the UE sends HARQ-ACK feedback information for the PDSCH through the PUCCH in a slot $n_{PUCCH}$. $n_{PUCCH}$ is the slot in which the PUCCH through which the HARQ-ACK feedback information for the PDSCH is sent is located, a slot n is an uplink slot, the uplink slot n refers to a slot structure of the PUCCH, and n is an uplink slot corresponding to the last symbol of the PDSCH. It may also be understood that the uplink slot n is the uplink slot corresponding to the last symbol of the PDSCH received by the UE in time domain. $n_B$ is a value that is in a preconfigured value set and that is obtained based on a value of a PDSCH-to-HARQ_feedback timing indicator field. Generally, the value in the preconfigured value set may be fixedly {1, 2, 3, 4, 5, 6, 7, 8}, or the value in the preconfigured value set may be a value preselected on a network side. B is the value of the PDSCH-to-HARQ_feedback timing indicator field, and the value of B corresponds to an index value in the preconfigured value set.

Further, the information indicating the resource used to feed back the HARQ acknowledgement information needs to be configured by the base station when the base station sends the success random access response to the UE. In addition, the base station also configures a transmission power control adjustment parameter (TPC command) of the PUCCH and the like for the terminal.

Because the MsgB is allowed to include success random access responses for a plurality of UEs, the base station needs to indicate, to each UE that receives the success random access response, the resource used to feed back the HARQ acknowledgement information. A possible solution is to add, to the success random access response for each UE, an indication field indicating a resource used to feed back an acknowledgement message. However, in the solution, a payload of the success random access response needs to be increased. Therefore, the embodiments of this application provide an information indication method, to avoid increasing a payload of a success random access response and further avoid increasing a payload of a random access response. For the method, refer to FIG. 5.

Before the information indication method provided in the embodiments of this application is described, RNTIs in the embodiments of this application are first described. In an example, in an NR system, values of different RNTIs are predefined. Details are listed in Table 1.

TABLE 1

| Value (value) | RNTI |
|---|---|
| 0000 | N/A |
| 0001-FFEF | RA-RNTI, TC-RNTI, C-RNTI, MCS-C-RNTI, CS-RNTI, TPC-PUCCH-RNTI, TPC-PUSCH-RNTI, TPC-SRS-RNTI, INT-RNTI, SFI-RNTI, and SP-CSI-RNTI |
| FFF0-FFFD | Reserved (reserved) |
| FFFE | P-RNTI |
| FFFF | SI-RNTI |

It can be learned from Table 1 that a value range of the RA-RNTI, the TC-RNTI, and the C-RNTI is 1 to 65519 (in hexadecimal: FFEF; in binary: 1111111111101111). A value of the RA-RNTI may satisfy formula (3):

$$RA\text{-}RNTI=1+s\_id+14\times t\_id+14\times 8o\times f\_id+14\times 8o\times 8\times ul\_carrier\_id \quad (3)$$

s_id is an index number (0≤s_id<14) of the first orthogonal frequency division multiplexing (orthogonal frequency division multiplexing, OFDM) symbol of each PRACH transmission occasion (PRACH occasion, RO). t_id is an index number (0≤t_id<80) of the first slot in which a PRACH transmission occasion is located in a system frame. A value of the slot is related to a carrier spacing. That is, when $\Delta f_{RA}\in\{1.25,5\}$, μ=0; otherwise, a value of μ is determined by $\Delta f_{RA}\in\{15,30,60,120\}$. In this case, a correspondence between a subcarrier spacing $\Delta f_{RA}$ and the parameter μ is listed in Table 2. f_id is an index number (0≤f_id<8) of a frequency domain resource on which a PRACH transmission occasion is located. ul_carrier_id is an index number of an uplink carrier used for random access preamble transmission (where 0 represents a normal uplink carrier (normal UL carrier, NUL), and 1 represents a supplementary uplink carrier (supplementary UL carrier, SUL). It can be learned according to the formula (3) that, the value range of the RA-RNTI is 1 to 17920 (in hexadecimal: 4600; in binary: 0100011000000000). It may be understood that, the RA-RNTI may be used to perform, in the 4-step RACH, scrambling on a cyclic redundancy check (cyclic redundancy check, CRC) of the PDCCH for scheduling the PDSCH, when the base station sends the response information (carried on the PDSCH) to the UE.

TABLE 2

| μ | $\Delta f_{RA}=2^{\mu}\cdot 15$ [kHz] |
|---|---|
| 0 | 15 |
| 1 | 30 |
| 2 | 60 |
| 3 | 120 |
| 4 | 240 |

Figure 4:
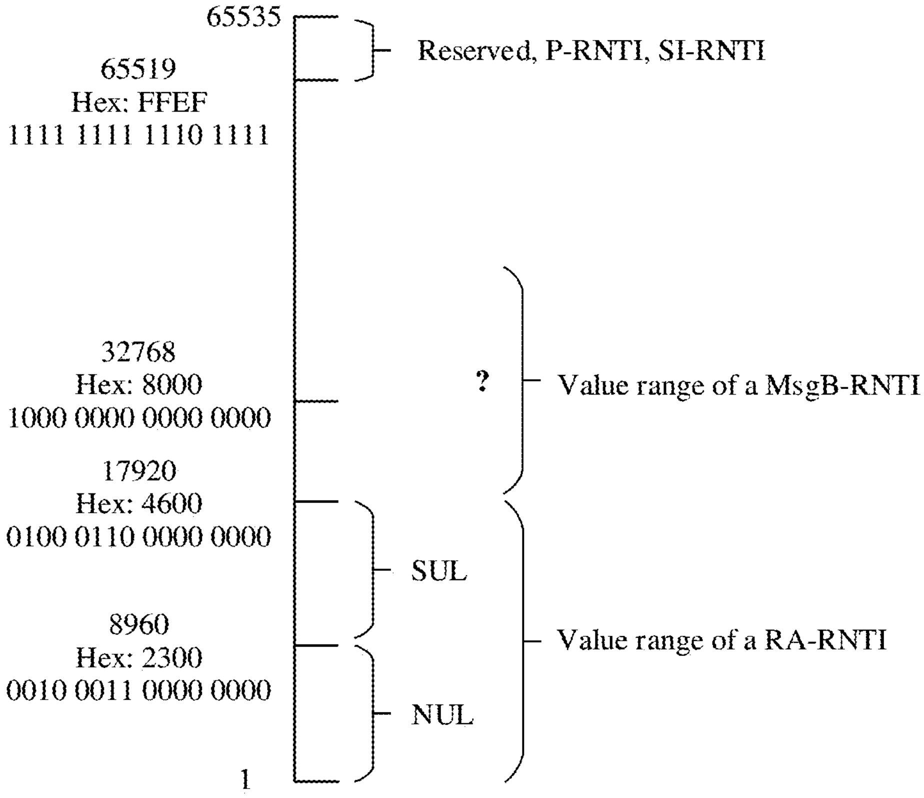
FIG. 4 is a schematic diagram of a value range of each RNTI according to an embodiment of this application.

In an example, to distinguish between the response information in the 2-step RACH and the response information in the 4-step RACH, a possible method is as follows: When sending a random access response (carried on a PDSCH) to a terminal in the 2-step RACH, a base station scrambles, by using a new RNTI, a CRC of a PDCCH for scheduling the PDSCH. For clarity in the following descriptions, the new RNTI may be referred to as a MsgB-RNTI. For example, a value of the MsgB-RNTI may be obtained through calculation based on a transmission resource of a MsgA in the 2-step RACH, or obtained through calculation based on a PRACH resource carrying a preamble in a MsgA, or obtained through calculation based on a PUSCH resource carrying uplink data in a MsgA, or obtained through calculation based on a PRACH resource carrying a preamble and a PUSCH resource carrying uplink data in a MsgA, or obtained through calculation based on a preamble sequence and/or information about a demodulation reference signal (demodulation reference signal, DMRS) sequence on the basis of the foregoing calculation method. It may be understood that the value of the MsgB-RNTI does not collide with the value of the RA-RNTI. It may be understood that a name of the MsgB-RNTI is not limited in the embodiments of this application. During specific implementation, the MsgB-RNTI may further include another name or the like. For example, for the value of the RA-RNTI and the value of the MsgB-RNTI, refer to FIG. 4, and for a value of another RNTI, refer to Table 1. It may be understood that Table 1 and Table 2 listed above are merely examples, and should not be construed as a limitation on the embodiments of this application.

The following describes in detail the information indication method provided in the embodiments of this application.

Figure 5:
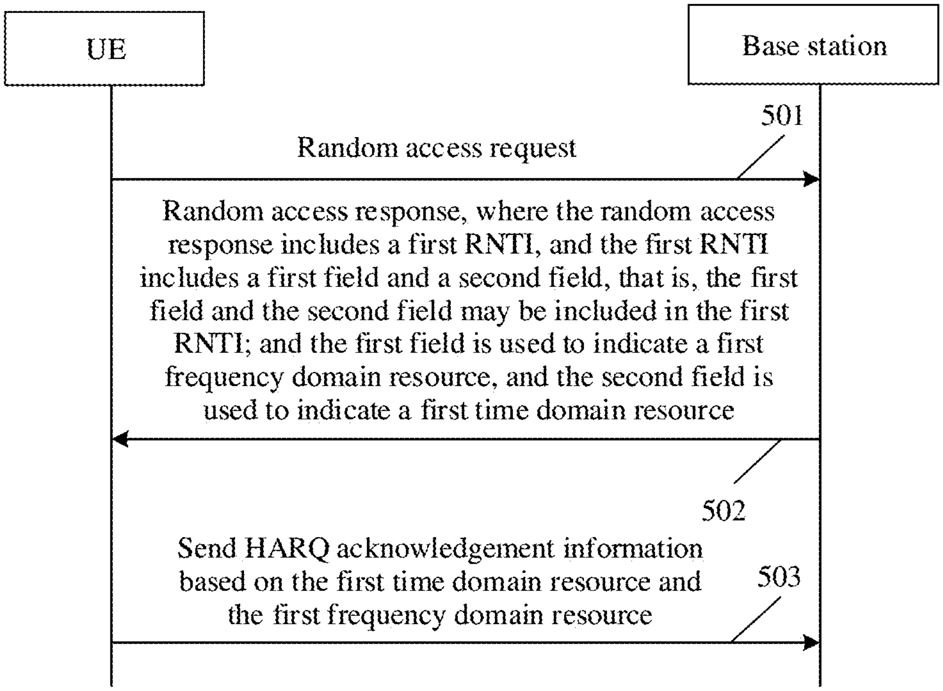
FIG. 5 is a schematic flowchart of an information indication method according to an embodiment of this application.

FIG. 5 is a schematic flowchart of an information indication method according to an embodiment of this application. The method may be applied to the system shown in FIG. 1. As shown in FIG. 5, the method includes the following steps.

501: UE sends a random access request to a base station, and the base station receives the random access request.

In this embodiment of this application, the random access request is a random access request in a 2-step random access procedure. In other words, the random access information may include a preamble and data. Alternatively, the random access request may not be limited to the random access request in the 2-step random access procedure, or may be a random access request in another type of random access procedure or the like in the future.

502: The base station sends a random access response to the UE, and the UE receives the random access response.

The random access response may include a success random access response and/or a fallback random access response. For specific descriptions of the success random access response and the fallback random access response, refer to the foregoing embodiment. To be specific, the random access response may include response information for a plurality of UEs. After receiving the random access response, the UE may learn, based on a preamble index or a contention resolution ID in the response information, that the response information is sent to the UE.

In an example, steps 501 and 502 may be a random access procedure of another type. Therefore, for example, the random access request sent by the UE does not include a preamble but includes uplink data. In this case, steps 501 and 502 may be replaced with the following:

5011: UE sends a random access request to a base station, and the base station receives the random access request. The random access request is a random access request that does not include a preamble, and the random access information includes uplink data.

5022: The base station sends a random access response to the UE, and the UE receives the random access response. For example, the base station may measure a timing advance based on a demodulation reference signal (DMRS) in the uplink data. If the base station successfully detects the DMRS, but fails to decode the uplink data, the base station sends response information for the DMRS to the UE. If the base station successfully decodes the uplink data, the base station sends response information for the uplink data to the UE. After receiving the random access response (including the response information), the UE may learn, based on a DMRS index or a contention resolution ID in the response information, that the response information is sent to the UE. It may be understood that, if the base station successfully decodes the uplink data, the base station needs to send HARQ acknowledgement information to the UE. Therefore, the UE needs to obtain a time-frequency resource for carrying (or feeding back) the HARQ acknowledgement information. In this case, the base station may include a first RNTI in the random access response, and the first RNTI may be as follows:

In this embodiment of this application, in step 502 or step 5022, the random access response includes the first RNTI, and the first RNTI includes a first field and/or a second field. In other words, the first field and the second field may be included in the first RNTI. The first field is used to indicate a first frequency domain resource, and the second field is used to indicate a first time domain resource. The first frequency domain resource may be understood as a frequency domain resource indicated by the PUCCH resource indicator field described above, and the first time domain resource may be understood as a time domain resource indicated by the PDSCH-to-HARQ_feedback timing indicator field described above. The first RNTI may include a C-RNTI. In other words, the first field and the second field may be included in the C-RNTI. For example, the random access response received by the UE includes the success random access response, the success random access response includes the C-RNTI, and the C-RNTI may include the first field and the second field. Therefore, the UE may determine, based on the first field and the second field, the time-frequency resource that is for carrying the HARQ acknowledgement information and in which a PUCCH is located. For a method for obtaining, by the UE based on the first field and the second field, the time-frequency resource in which the PUCCH is located, refer to the descriptions above, refer to descriptions about $n_B$ shown in FIG. 8, or refer to other related descriptions or the like. Details are not described herein. It may be understood that the first RNTI may alternatively be another RNTI, and the another RNTI is used to identify a unique identifier, for example, a TC-RNTI, used when data transmission is performed between the UE and the base station. It may be understood that the success random access response described above may have another name or the like in another type of random access procedure.

The following describes the method in this embodiment of this application by using an example in which the first RNTI is a C-RNTI.

A value of the C-RNTI is obtained based on an N-ary value corresponding to a bit length i of the first field and an N-ary value corresponding to a bit length j of the second field, and the N-ary value includes any one of a decimal value, an octal value, and a hexadecimal value. In other words, the UE may obtain the first time domain resource and the first frequency domain resource based on a value of bits of the C-RNTI. The following uses an example in which N is 10 to describe how the UE obtains the first time domain resource and the first frequency domain resource based on the C-RNTI.

Manner 1

The value of the C-RNTI satisfies the following formula (4) and formula (5):

$$o < D_1 \leq \text{First threshold, and } D_1 \neq D_2 \tag{4}$$

$$D_1 = C*2^{i+j} + A*2^j + B \text{ or } D_1 = C*2^{i+j} + B*2^i + A \tag{5}$$

$D_1$ is the value of the C-RNTI, $D_2$ is a value of a second RNTI, i is a bit length of the first field, j is a bit length of the second field, A is a decimal value of i bits, B is a decimal value of j bits, C is a decimal value of k bits, i+j+k=L, and L is a bit length of the C-RNTI. It may be understood that the first threshold may be 65519, and the value of the second RNTI is a possible value of an RNTI other than the first RNTI.

Figure 6:
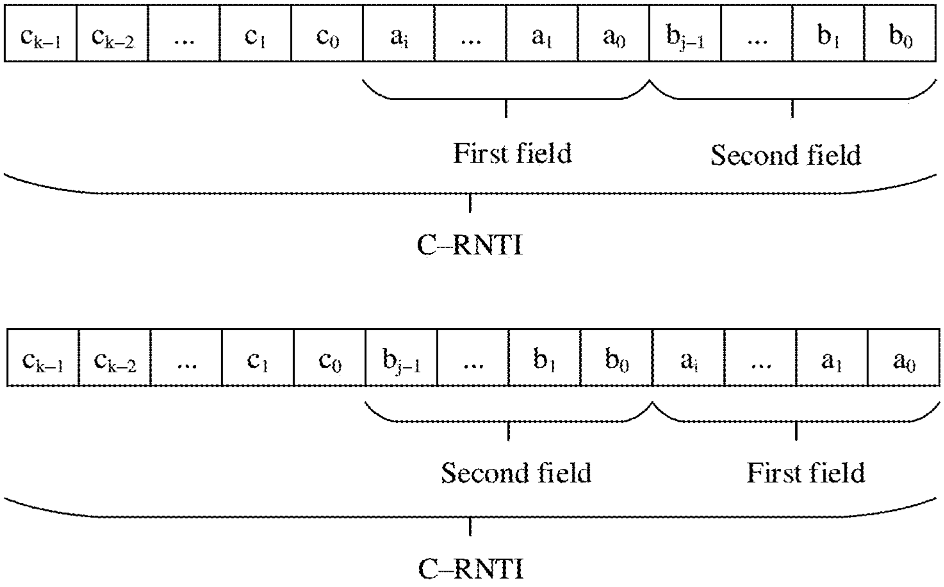
FIG. 6 is a schematic diagram of a format of a C-RNTI according to an embodiment of this application.

For example, a length of the first field, namely, the PUCCH resource indicator field, is i bits, and is represented by using ai−1 . . . a0, a value of the first field is A=ai−1*$2^{i-1}$+ . . . +a0*$2^0$, a length of the second field, namely, the PDSCH-to-HARQ_feedback timing indicator field, is j bits, and is represented by bj−1 . . . b0, and a value of the second field is B=bj−1*$2^{j-1}$+ . . . +b0*$2^0$. In this case, bits of the C-RNTI are represented as: ck−1 . . . c0 ai−1 . . . a0 bj−1 . . . b0 or ck−1 . . . c0 bj−1 . . . b0 ai−1 . . . a0. ck−1 . . . c0 are remaining bits, among all the bits of the C-RNTI, other than the bits occupied by the PUCCH resource indicator field and the PDSCH-to-HARQ_feedback timing indicator field, a length of ck−1 . . . c0 is k, and a value of the remaining bits is C=ck−1*$2^{k-1}$+ . . . +c0*$2^0$. i+j+k=L, where L is a bit length of the C-RNTI, as shown in FIG. 6. According to A, B, and C, the value of the C-RNTI may be shown in formula (6):

$$C\text{-}RNTI = C*2^{i+j} + A*2^j + B \text{ or}$$
$$C\text{-}RNTI = C*2^{i+j} + B*2^i + A \tag{6}$$

A value of C enables the value of the C-RNTI to be not greater than 65519 (hex: FFEF), and the value of the C-RNTI does not collide with a value of an RNTI of another type. Optionally, the RNTI of the another type may be any one or more of a RA-RNTI, a TC-RNTI, an MCS-C-RNTI, a CS-RNTI, a TPC-PUCCH-RNTI, a TPC-PUSCH-RNTI, a TPC-SRS-RNTI, an INT-RNTI, an SFI-RNTI, or an SP-CSI-RNTI. It may be understood that in this embodiment of this application, the RNTI of another type is not limited to the foregoing listed RNTI types, and may further include another possible RNTI type, for example, a MsgB-RNTI. Optionally, to reduce complexity of the value of the C-RNTI by the base station, the value of C may further satisfy formula (7):

$$\text{Second threshold} < C\text{-}RNTI \leq 6_{5519} \tag{7}$$

The second threshold may be understood as a maximum value of each RNTI. For example, the value of the C-RNTI may satisfy that the C-RNTI is less than or equal to 65519 (hex: FFEF), the C-RNTI is greater than a maximum value of the RA-RNTI and/or a maximum value of the MsgB-RNTI, and the value of the C-RNTI does not collide with a value of an RNTI of another type.

For example, the PUCCH resource indicator field is 4 bits (which may alternatively be 3 bits or another value), and is represented by a3a2a1a0, and the value of the PUCCH resource indicator field is A. The length of the PDSCH-to-HARQ_feedback timing indicator field is 3 bits (which may alternatively be 2 bits or another value), and is represented by b2b1b0, and the value of the PDSCH-to-HARQ_feedback timing indicator field is B. In this case, the bits of the C-RNTI are represented as: c8c7c6c5c4c3c2c1c0 a3a2a1a0 b2b1b0 or c8c7c6c5c4c3c2c1c0b2b1b0 a3a2a1a0. c8c7c6c5c4c3c2c1c0 are the remaining bits, among all the bits of the C-RNTI, other than the bits occupied by the PUCCH resource indicator field and the PDSCH-to-HARQ_feedback timing indicator field, and a value of c8c7c6c5c4c3c2c1c0 is C. In this case, C-RNTI=C*$2^7$+A*$2^3$+B or C-RNTI=C*$2^7$+B*$2^4$+A. In addition, the value of C enables the value of C-RNTI to be less than or equal to 65519 (hex: FFEF) and greater than the maximum value of the RA-RNTI and the maximum value of the MsgB-RNTI, and the value of C-RNTI does not collide with a value of an RNTI of another type.

Manner 2

The value of the C-RNTI satisfies formula (8) and formula (9):

$$o < D_1 < a \text{ first threshold, and } D_1 \neq D_2 \tag{8}$$

$$D_1 = A*2^{j+k} + B*2^k + C \text{ or } D_1 = B*2^{i+k} + A*2^k + C \tag{9}$$

$D_1$ is the value of the C-RNTI, $D_2$ is a value of a second RNTI, i is a bit length of the first field, j is a bit length of the second field, A is a decimal value of i bits, B is a decimal value of j bits, C is a decimal value of k bits, i+j+k=L, and L is a bit length of the C-RNTI.

Figure 7:
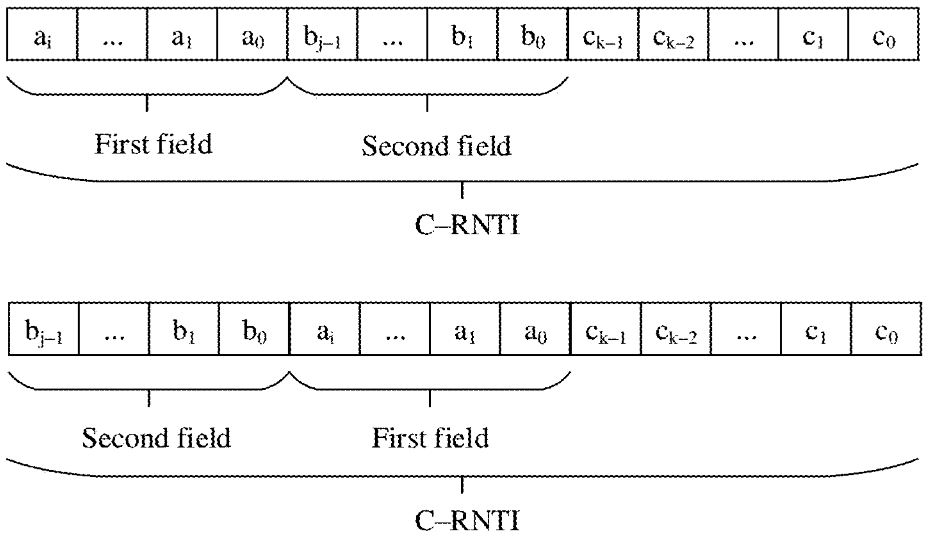
FIG. 7 is a schematic diagram of a format of a C-RNTI according to an embodiment of this application.

For example, a length of the first field, namely, the PUCCH resource indicator field, is i bits, and is represented by using ai−1 . . . a0, a value of the first field is A=ai−1*$2^{i-1}$+ . . . +a0*$2^0$, a length of the second field, namely, the PDSCH-to-HARQ_feedback timing indicator field, is j bits, and is represented by bj−1 . . . b0, and a value of the second field is B=bj−1*$2^{j-1}$+ . . . +b0*$2^0$. In this case, bits of the C-RNTI are represented as: ai−1 . . . a0 bj−1 . . . b0 ck−1 . . . c0, or bj−1 . . . b0 ai−1 . . . a0 ck−1 . . . c0. ck−1 . . . c0 are remaining bits, among all the bits of the C-RNTI, other than the bits occupied by the PUCCH resource indicator field and the PDSCH-to-HARQ_feedback timing indicator field, a length of ck−1 . . . c0 is k, and a value of the remaining bits is C=ck−1*$2^{k-1}$+ . . . +c0*$2^0$. i+j+k=L, where L is a bit length of the C-RNTI, as shown in FIG. 7. According to A, B, and C, the value of the C-RNTI may be shown in formula (10):

$$C\text{-}RNTI = A*2^{j+k} + B*2^k + C \text{ or}$$
$$C\text{-}RNTI = B*2^{i+k} + A*2^k + C \tag{10}$$

For example, if the values of A and B enable the value of the C-RNTI to be greater than a maximum value of the RA-RNTI and/or a maximum value of the MsgB-RNTI, the value of C needs to satisfy that the value of the C-RNTI is less than or equal to 65519 (hex: FFEF), and the value of the C-RNTI does not collide with a value of an RNTI of another type. Optionally, the RNTI of the another type may be any one or more of a TC-RNTI, an MCS-C-RNTI, a CS-RNTI, a TPC-PUCCH-RNTI, a TPC-PUSCH-RNTI, a TPC-SRS-RNTI, an INT-RNTI, an SFI-RNTI, or an SP-CSI-RNTI. For another example, if the values of A and B enable the value of the C-RNTI to be less than the maximum value of the RA-RNTI and/or the maximum value of the MsgB-RNTI, the value of C needs to satisfy that the value of the C-RNTI does not collide with the value of the RA-RNTI and/or the value of the MsgB-RNTI.

For example, the PUCCH resource indicator field is 4 bits (which may alternatively be 3 bits or another value), and is represented by a3a2a1a0, and the value of the PUCCH resource indicator field is A. The length of the PDSCH-to-HARQ_feedback timing indicator field is 3 bits (which may alternatively be 2 bits or another value), and is represented by b2b1b0, and the value of the PDSCH-to-HARQ_feedback timing indicator field is B. In this case, the bits of the C-RNTI are represented as: a3a2a1a0 b2b1b0 c8c7c6c5c4c3c2c1c0 or b2b1b0 a3a2a1a0 c8c7c6c5c4c3c2c1c0. c8c7c6c5c4c3c2c1c0 are the remaining bits, among all the bits of the C-RNTI, other than the bits occupied by the PUCCH resource indicator field and a PDSCH-to-HARQ-ACK feedback timing indicator field, and a value of c8c7c6c5c4c3c2c1c0 is C. In this case, C-RNTI=A*$2^{12}$+B*$2^{9}$+C or C-RNTI=B*$2^{13}$+A*$2^{9}$+C.

The value of C needs to satisfy explanations that the value of C-RNTI does not collide with the value of the RA-RNTI and the value of the MsgB-RNTI, as listed in Table 3:

TABLE 3

| PRACH configuration index | Preamble format | $n_{SFN}$ mod x = y: x | y | Subframe number | Start symbol | Quantity of PRACH slots in one subframe | $N_t^{RA,slot}$ | $N_{dur}^{RA}$ |
|---|---|---|---|---|---|---|---|---|
| 0 | 0 | 16 | 1 | 1 | 0 | | | 0 |
| . . . | | | | | | | | |
| 234 | C0 | 1 | 0 | 0, 1, 2, 3, 4, 5, 6, 7, 8, 9 | 0 | 2 | 7 | 2 |

An RO configuration in Table 3 is applicable to a case in which a terminal communications mode is frequency division duplex (frequency division duplexing, FDD). According to Table 3, it can be learned that: a value range of the RA-RNTI is 1+{0, 2, 4, 6, 8, 10, 12}+14*{0 to 19}+14*80*{0 to 7}+14*80*8*{0, 1}. According to the value range of the RA-RNTI, it can be learned that the value of the RA-RATI is an odd number, and the maximum value is 17077, which is represented as 0100 0010 1011 0101 in binary.

Impact of the value of the RA-RNTI on the C-RNTI is used as an example. In this case, a possible value range of the C-RNTI is as follows:

If values of a3a2a1a0 and b2b1b0 make the C-RNTI≤17077, the value of c8c7c6c5c4c3c2c1c0 satisfies mod (C, 2)=0. If a3a2a1a0 and b2b1b0 make the C-RNTI>17077, the value of the c8c7c6c5c4c3c2c1c0 makes the value of the C-RNTI to be less than or equal to 65519 (hex: FFEF), and not to collide with a value of another RNTI.

It may be understood that the foregoing method for determining the value of the C-RNTI based on the RO configuration in Table 3 is not unique, and is merely used to describe a possible value of the C-RNTI when some bits in the C-RNTI are used for the PUCCH resource indicator in this embodiment of this application. Therefore, a method for determining the value of the C-RNTI and a value range of the C-RNTI are not limited to the foregoing embodiment, and may vary with another possible RO configuration. A specific method for determining the value of the C-RNTI is not limited in this embodiment of this application.

In the foregoing cases, the information that is obtained by the UE and that indicates the resource used to feed back the HARQ acknowledgement information is carried in the first RNTI included in the response information sent by the base station to the UE. The UE may obtain, based on the first field and the second field in the first RNTI, the resource used to feed back the HARQ acknowledgement information.

For example, the UE obtains, based on the PUCCH resource indicator (namely, the first field), the frequency domain resource (namely, the first frequency domain resource) used to feed back the HARQ acknowledgement information. For details, refer to a formula (11):

$$r_{PUCCH} = \left\lfloor \frac{2n_{CCE,0}}{N_{CCE,0}} \right\rfloor + 2\cdot\Delta_{PRI} \text{ or } r_{PUCCH} = \Delta_{PRI} \tag{11}$$

$\Delta_{PRI}$=$\Delta_{PRI\_UE}$, and $\Delta_{PRI\_UE}$ is the value of the first field and the value of the PUCCH resource indicator field.

For example, the UE obtains, based on the PDSCH-to-HARQ_feedback timing indicator (namely, the second field), the time domain resource (namely, the first time domain resource) used to feed back the HARQ acknowledgement information. For details, refer to a formula (12):

$$n_{PUCCH} = n + n_B \tag{12}$$

A slot n is an uplink slot corresponding to the last symbol of a PDSCH, $n_B$ is a value that is in a preconfigured value set and that is obtained based on the value B of the PDSCH-to-HARQ_feedback timing indicator, and B is the value of the second field, namely, the PDSCH-to-HARQ_feedback timing indicator field. For a specific value of $n_{PUCCH}$, further refer to the following method in FIG. 8. Details are not described herein.

503: The UE sends the HARQ acknowledgement information based on the first time domain resource and the first frequency domain resource.

In this embodiment of this application, the UE may determine, based on the first time domain resource and the first frequency domain resource, the time-frequency resource that is used to carry the HARQ acknowledgement information and in which the PUCCH is located, to send the HARQ acknowledgement information on the time-frequency resource in which the PUCCH is located. For a method for obtaining, by the UE based on the first field and the second field, the time-frequency resource in which the PUCCH is located, refer to the foregoing descriptions. Alternatively, for a method for obtaining, by the UE based on the second field, a time domain resource in which the PUCCH is located, refer to the descriptions about $n_B$ shown in FIG. 8. Details are not described herein.

During implementation of this embodiment of this application, the C-RNTI includes the PUCCH resource indicator field and the PDSCH-to-HARQ_feedback timing indicator field, thereby effectively avoiding an increase in a payload of the response information.

In some embodiments of this application, for example, in a random access procedure, the success random access response includes a contention resolution identifier (contention resolution ID, CRID). The CRID may be carried on a PDSCH scheduled by using DCI. The UE receives the response information that carries the CRID and that is sent by the base station, the UE needs to send the HARQ acknowledgement information to the base station, and the HARQ acknowledgement information may be used to respond to that the UE receives the PDSCH of the CRID.

Herein, a 4-step RACH is used as an example to describe a moment at which the UE sends the HARQ acknowledgement information and a moment at which a timing advance command takes effect. In the 4-step RACH, after the UE sends a Msg1 preamble, the UE receives a random access response Msg2 sent by the base station. The random access response includes the timing advance command (TA command), the timing advance command is used by the UE to perform time adjustment for uplink data transmission, and the uplink data transmission does not include PUSCH transmission scheduled by an uplink scheduling grant (UL grant) in the random access response. If an uplink slot in which the UE receives the timing advance command is n2, a time at which the timing advance command takes effect is $n2+k_{TA}+1$, where $k_{TA}$ satisfies formula (13):

$$k_{TA} = \lceil N_{slot}^{subframe,\mu} \cdot (N_{T,1} + N_{T,2} + N_{TA,max} + 0.5) / T_{sf} \rceil \quad (13)$$

$N_{T,1}$ is a time domain length (in a unit of ms) of $N_1$ OFDM symbols, and corresponds to receiving duration of the PDSCH, a user processing capability is 1, and an additional PDSCH DMRS is configured. If μ=0, and assuming that $N_{T,1}=14$, $N_{T,2}$ is a time domain length (in a unit of ms) of $N_2$ OFDM symbols, and corresponds to preparation duration of the PUSCH, and a user processing capability is 1; $N_{TA,max}$ is a maximum timing advance value (in a unit of ms) provided by a 12-bit timing advance command;

$$N_{slot}^{subframe,\mu}$$

is a quantity of slots in each subframe; and $T_{sf}$ is a length of a subframe of 1 ms. $N_{T,1}$ and $N_{T,2}$ are determined based on a configured minimum subcarrier spacing, and the minimum subcarrier spacing is a minimum subcarrier spacing that is of all uplink carriers of all uplink BWPs and all downlink carriers of all downlink BWPs and to which the timing advance command configured on a network side is applied. The slot n2 and the quantity $$N_{slot}^{subframe,\mu}$$

of slots are determined based on a configured minimum subcarrier spacing, the minimum subcarrier spacing is a minimum subcarrier spacing that is of all the uplink carriers of all the uplink BWPs and to which the timing advance command configured on the network side is applied, the slot n2 is the last slot of uplink slots that overlap a received PDSCH when it is assumed that $T_{TA}=0$, and the received PDSCH carries the timing advance command. $N_{TA,max}$ is determined based on a configured minimum subcarrier spacing, and the minimum subcarrier spacing is a minimum subcarrier spacing that is of all the uplink carriers of all the uplink BWPs and all carriers of initial uplink BWPs and to which the timing advance command configured on the network side is applied.

In the 4-step RACH, after sending a Msg3, the UE receives contention resolution information Msg4 sent by the base station, the Msg4 is a PDSCH scheduled by using a DCI format 1_0, and an end slot of the PDSCH is a slot n1, so that a slot in which the UE sends the HARQ acknowledgement information is n1+k. The slot n1 is an uplink slot, for the uplink slot n1, refer to a slot structure of the PUCCH, the uplink slot n1 is an uplink slot corresponding to the last symbol of the PDSCH received by the UE in time domain, k represents a quantity of slots, and a value of k is determined by the PDSCH-to-HARQ_feedback timing indicator field.

It can be learned from a slot in which the timing advance command takes effect in the 4-step RACH that, when the UE sends the HARQ acknowledgement information to the base station, a timing advance timer is in a running state, that is, a timing advance is in a valid state.

However, in the 2-step RACH, when the UE receives the response information, including the contention resolution ID, that is in response to the MsgA and that is sent by the base station, the UE obtains both the timing advance command and the information indicating the resource used to feed back the HARQ acknowledgement information, and the information indicating the resource used to feed back the HARQ acknowledgement information includes the PUCCH resource indicator and the PDSCH-to-HARQ_feedback timing indicator. Therefore, when the UE sends the HARQ acknowledgement information, the UE cannot determine whether the timing advance command is in the valid state.

Figure 8:
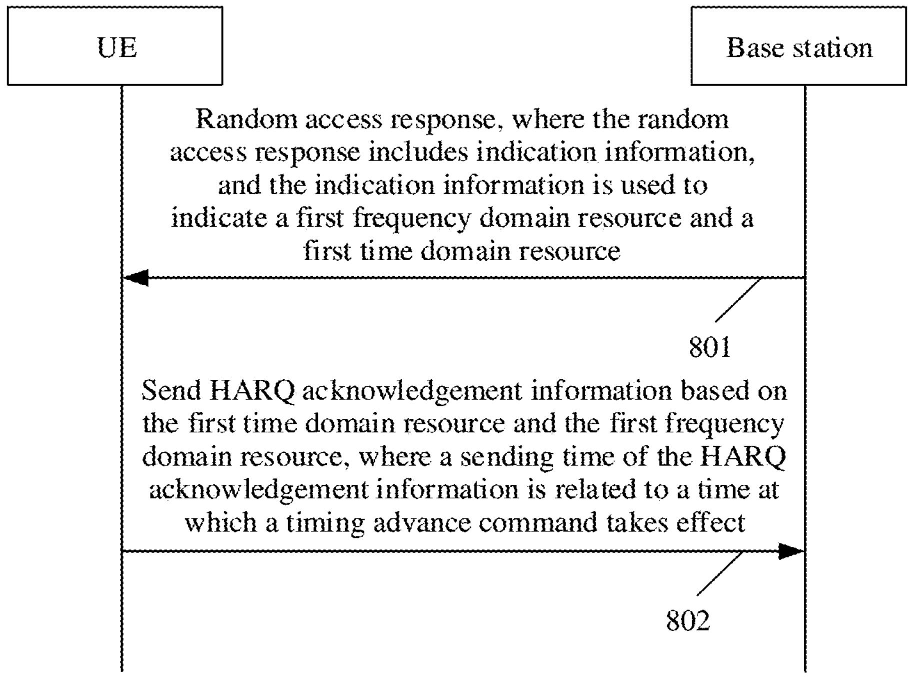
FIG. 8 is a schematic flowchart of an information indication method according to an embodiment of this application.

Therefore, an embodiment of this application further provides an information indication method. FIG. 8 is a schematic flowchart of an information indication method according to an embodiment of this application. The method may be applied to the system shown in FIG. 1. As shown in FIG. 8, the method includes the following steps.

801: A base station sends a random access response to UE, and the UE receives the random access response. The random access response includes indication information, and the indication information is used to indicate a first frequency domain resource and a first time domain resource.

It may be understood that a specific position of the indication information in the random access response is not limited in this embodiment of this application.

For example, information used to indicate a time-frequency resource carrying HARQ acknowledgement information (a time-frequency resource indicator of a PUCCH) may be included in a PDSCH carrying response information, or may be implicitly included in other information in the PDSCH carrying the response information; or is included in a PDCCH (namely, DCI) for scheduling the PDSCH carrying the response information. The information used to indicate the time-frequency resource carrying the HARQ acknowledgement information is the indication information shown in step 801.

For another example, the indication information may be carried in the first C-RNTI shown in FIG. 5. Details are not described herein again.

802: The UE sends the HARQ acknowledgement information based on the first time domain resource and the first frequency domain resource, where a sending slot of the HARQ acknowledgement information is related to a slot in which a timing advance command takes effect.

In some embodiments of this application, the random access response further includes the timing advance command.

For example, when a random access request sent by the UE to the base station includes a preamble and uplink data (namely, a MsgA PRACH and a MsgA PUSCH), or the random access request sent by the UE to the base station includes uplink data (namely, only a PUSCH), and the base station correctly decodes all random access requests, the UE may receive response information, including a contention resolution ID, that is sent by the base station and that is in response to the random access request (which may also be understood as the random access response including a contention resolution ID). In addition to the contention resolution ID, the response information further includes a timing advance command and information indicating a resource used to feed back the HARQ acknowledgement information.

In some embodiments of this application, the response information may not include the contention resolution ID. For example, the response information includes the timing advance command and the information indicating the time-frequency resource used to carry the HARQ acknowledgement information. However, a CRC of the PDCCH for scheduling the response information is scrambled by a unique identifier of a user. For example, the CRC of the PDCCH for scheduling the response information is scrambled by a C-RNTI of the user.

In the foregoing case, a moment at which the UE receives the timing advance command is the same as a moment at which the UE receives PUCCH resource indication information. To be specific, an end moment at which the UE receives the timing advance command carried on the PDSCH is the same as an end moment at which the UE receives a PDSCH-to-HARQ_feedback timing indicator carried on the PDSCH.

In this embodiment of this application, for example, the indication information and the timing advance command are carried on a same physical downlink shared channel PDSCH. For another example, the timing advance command is carried in downlink control information DCI, and the indication information is carried on a PDSCH scheduled by the DCI. For another example, the indication information and the timing advance command are carried in same DCI. For another example, the timing advance command is carried on a PDSCH scheduled by DCI, and the indication information is carried in the DCI.

In this case, a specific relationship between the sending slot of the HARQ acknowledgement information and the slot in which the timing advance command takes effect may be shown as follows:

Manner 1

The slot in which the UE sends the HARQ acknowledgement information to the base station satisfies formula (14), (15), or (16):

$$n_{PUCCH} = n_{TA} + n_B;\text{ or} \tag{14}$$

$$n_{PUCCH} = n + k_{TA} + n_B;\text{ or} \tag{15}$$

$$n_{PUCCH} = \max\{n + n_B,\ n + k_{TA} + 1\} \tag{16}$$

$n_{PUCCH}$ is the slot in which the UE sends the HARQ acknowledgement information, $n_{TA}$ is the slot in which the timing advance command takes effect, $n_{TA}=n+k_{TA}+1$, a slot n is an end slot of the PDSCH or it may be understood that the slot n is an uplink slot corresponding to the last symbol of the PDSCH, and $k_{TA}$ is a timing advance adjustment parameter. For a value of $k_{TA}$, refer to the foregoing embodiment. $n_B$ is a specific value whose index is B in a preconfigured value set, and B is a specific value of a field indicating the first time domain resource. For specific descriptions of B, refer to the foregoing embodiment. The end slot of the PDSCH may also be understood as the end slot of the PDSCH. To be specific, the slot n is the last slot in which the UE receives the PDSCH carrying the timing advance command and/or the information indicating the resource used to feed back the HARQ acknowledgement information, or the slot n is the last slot of the PDSCH scheduled by the DCI carrying the resource used to feed back the HARQ acknowledgement information. The slot $n_{TA}$ is the slot in which the timing advance command received by the UE takes effect. In addition, a minimum slot interval between a slot in which the UE performs PUCCH transmission and the last slot in which the UE receives the PDSCH is $N_{T,1}$+0.5 (ms), where $N_{T,1}$ is a time domain length (in a unit of ms) of $N_1$ OFDM symbols, and corresponds to receiving duration of the PDSCH, a user processing capability is 1, and an additional PDSCH DMRS is configured. If μ=0, it is assumed that $N_{T,1}$=14.

In some embodiments, the slot in which the UE sends the HARQ acknowledgement information to the base station may alternatively satisfy formula (17), (18), or (19):

$$n_{PUCCH} = n_{TA} + n_B + \Delta_{RAR};\text{ or} \tag{17}$$

$$n_{PUCCH} = n + k_{TA} + n_B + \Delta_{RAR};\text{ or} \tag{18}$$

$$n_{PUCCH} = \max\{n + n_B + \Delta_{RAR},\ n + k_{TA} + 1\} \tag{19}$$

$n_{PUCCH}$ is the slot in which the UE sends the HARQ acknowledgement information, $\Delta_{RAR}$ is a constant preconfigured in a network, and a value of $\Delta_{RAR}$ is determined based on a subcarrier spacing $\mu$. For example, a relationship between $\Delta_{RAR}$ and the subcarrier spacing $\mu$ is listed in Table 4.

TABLE 4

| μ | $\Delta_{RAR}$ |
|---|---|
| 0 | 2 |
| 1 | 3 |

TABLE 4-continued

| μ | $\Delta_{RAR}$ |
|---|---|
| 2 | 4 |
| 3 | 6 |

The subcarrier spacing $\mu$ may be one of values of subcarrier spacings of the following several data channels: The subcarrier spacing $\mu$ is a subcarrier spacing of a PUSCH to be sent by the UE; or the carrier spacing $\mu$ is a subcarrier spacing of a PUCCH to be sent by the UE, and the PUCCH is used to send the HARQ acknowledgement information; or the carrier spacing $\mu$ is a subcarrier spacing of a PDSCH received by the UE, and the UE needs to send the HARQ acknowledgement information after receiving the PDSCH.

It may be understood that the relationship between $\Delta_{RAR}$ and the subcarrier spacing $\mu$ may be another predefined relationship, and is not limited to the value relationship listed in Table 4.

$n_B$ may be a specific value indicated by a PDSCH-to-HARQ_feedback timing indicator field. Alternatively, $n_B$ may be a value that is in a predefined value set and that is obtained based on an index number indicated by the indicator field. For example, the value of $n_B$ may include the following two methods:

Method 1: $n_B$=a specific value corresponding to the PDSCH-to-HARQ_feedback timing indicator field.

For the method 1, the value indicated by the PDSCH-to-HARQ_feedback timing indicator field is the value of $n_B$. For example, if a bit length of the PDSCH-to-HARQ_feedback timing indicator field is 3 bits, the value of $n_B$ is a value that ranges from 0 to 7 and that corresponds to a bit of the PDSCH-to-HARQ_feedback timing indicator field. It may be understood that the bit length of the PDSCH-to-HARQ_feedback timing indicator field is not limited to the bit length described in the example.

Method 2: $n_B$=a specific value in the preset value set, and a specific value of the PDSCH-to-HARQ_feedback timing indicator field corresponds to an index number in the preset value set.

For the method 2, there is an index relationship between $n_B$ and a value indicated by the PDSCH-to-HARQ_feedback timing indicator field. For example, if a bit length of the PDSCH-to-HARQ_feedback timing indicator field is 3 bits, the value of $n_B$ ranges from 0 to 7, and an offset set that is of a PDSCH-to-HARQ_feedback timing and that is configured in the network is {1, 2, 3, 4, 5, 6, 7, 8}. In this case, when bits of the PDSCH-to-HARQ_feedback timing indicator field are 000, $n_B$=1; when bits of the PDSCH-to-HARQ_feedback timing indicator field are 001, $n_B$=2; and so on. It may be understood that the bit length of the PDSCH-to-HARQ_feedback timing indicator field is not limited to the bit length described in the example, and the offset set that is of the PDSCH-to-HARQ_feedback timing and that is configured in the network is not limited to the value set described in the example.

It may be understood that the foregoing method 1 and manner 2 are merely examples, and should not be construed as limitations on the embodiments of this application.

Manner 2

If the UE is in an RRC connected state, a timing advance timer of the UE is running, or a timing advance state of the UE is valid. In this case, if the response information sent by the base station to the UE still includes the timing advance command and the information indicating the resource used to feed back the HARQ acknowledgement information, the slot in which the timing advance command takes effect satisfies the formula (20), and at the same time, the timing advance timer is restarted or timing is updated:

$$n_{TA\_update} = n + k_{TA} + \Delta \quad (20)$$

The slot in which the UE sends the HARQ acknowledgement information to the base station satisfies formula (21), (22), (23), or (24):

$$n_{PUCCH} = n_{TA\_update} + n_B\text{; or} \quad (21)$$

$$n_{PUCCH} = n + k_{TA} + n_B\text{; or} \quad (22)$$

$$n_{PUCCH} = \max\{n + n_B, n_{TA\_update}\}\text{; or} \quad (23)$$

$$n_{PUCCH} = n + n_B \quad (24)$$

$\Delta$ is a constant (for example, may be 1), $n_{PUCCH}$ is the slot in which the UE sends the HARQ acknowledgement information, $n_{TA}$ is the slot in which the timing advance command takes effect, and a slot n is an uplink slot corresponding to the last symbol of a PDSCH. The PDSCH carries the response information sent by the base station, $k_{TA}$ is a TA adjustment parameter, and $n_B$ is a specific value of the first time domain resource indicated by an endex. For values of $k_{TA}$ and $n_B$, refer to the descriptions in the foregoing embodiment.

In some other embodiments, the slot in which the UE sends the HARQ acknowledgement information to the base station satisfies formula (25), (26), (27), or (28):

$$n_{PUCCH} = n_{TA\_update} + n_B + \Delta_{RAR}\text{; or} \quad (25)$$

$$n_{PUCCH} = n + k_{TA} + n_B + \Delta_{RAR}\text{; or} \quad (26)$$

$$n_{PUCCH} = \max\{n + n_B + \Delta_{RAR}, n_{TA\_update}\}\text{; or} \quad (27)$$

$$n_{PUCCH} = n + n_B + \Delta_{RAR} \quad (28)$$

$n_{PUCCH}$ is the slot in which the UE sends the HARQ acknowledgement information, $\Delta_{RAR}$ is a constant preconfigured in a network, and a value of $\Delta_{RAR}$ is determined based on a subcarrier spacing $\mu$. For example, a relationship between $\Delta_{RAR}$ and the subcarrier spacing $\mu$ is listed in Table 4.

It may be understood that the relationship between $\Delta_{RAR}$ and the subcarrier spacing $\mu$ may be another predefined relationship, and is not limited to the value relationship listed in Table 4.

The formulas (14) and (21) indicate that the UE starts to calculate a transmission slot of the PUCCH in the slot in which the timing advance command takes effect, that is, a slot in which the timing advance command takes effect or is updated. The formulas (15), (16), (22), and (23) indicate that a moment at which the PUCCH is sent may be the same as a moment at which the timing advance command takes effect, or a slot offset is considered at the moment at which the timing advance command takes effect. The formula (24) indicates that the PUCCH may be sent when a current timing advance state is valid, and there is no need to wait for the timing advance command to be updated.

In this embodiment of this application, a slot interval in which the timing advance command received by the terminal takes effect is considered for a transmission moment at which the UE sends the HARQ acknowledgement information PUCCH, to ensure validity of sending the PUCCH by the terminal, so that the base station can correctly detect the PUCCH.

In some embodiments of this application, if success random access response sent by the base station to the UE does not include the timing advance command, the slot in which the UE sends the HARQ acknowledgement information to the base station may satisfy formula (29):

$$n_{PUCCH} = n + n_B \quad (29)$$

The slot n is an uplink slot corresponding to the last symbol in which a PDSCH that carries the success random access response and that is sent by the base station is located, and the PDSCH carries a resource indicator that is used to indicate a resource used to feed back the HARQ acknowledgement information, or DCI for scheduling the PDSCH resource carries a resource indicator that is used to indicate a resource used to feed back the HARQ acknowledgement information.

In some embodiments of this application, in different random access procedures, the response information may be any one of the following. For example, when initiating a 4-step random procedure, the UE receives random access response (RAR) information sent by the base station for a preamble. Alternatively, in some embodiments, the UE initiates a 2-step random access procedure, the base station detects only a sent preamble, and the UE receives fallback random access response (fallback RAR) sent by the base station for a preamble. Alternatively, in some embodiments, the UE initiates a 2-step random access procedure, and after a maximum quantity of sending times in the 2-step random access procedure is reached, the UE falls back to 4-step random access. In this case, the UE receives random access response (RAR) information sent by the base station for a preamble. Alternatively, in some embodiments, the UE sends only uplink data (which is carried on a PUSCH), and the base station detects only a DMRS of the PUSCH. In this case, the UE receives a random access response sent by the base station for the DMRS. When the base station correctly detects a preamble/the DMRS, the base station sends response information for the preamble/DMRS to the UE, and the UE receives the response information. The response information includes a timing advance command. The timing advance command is used by the UE to adjust a moment of uplink data transmission, and the uplink data transmission does not include PUSCH transmission scheduled by an uplink scheduling grant (UL grant) in the response information.

In some embodiments of this application, the UE may obtain, by using another method, the information about the resource used to feed back the HARQ acknowledgement information.

The UE may further obtain the first time domain resource and the first frequency domain resource based on common indication information used to feed back the HARQ acknowledgement information in the DCI and user-level information of a resource used to feed back the HARQ acknowledgement information. The user-level information of the resource used to feed back the HARQ acknowledgement information is included in the response information carried on the PDSCH scheduled by using the DCI. A form of the user-level information of the resource used to feed back the HARQ acknowledgement information in the response information carried on the PDSCH is not limited herein, and may be as follows:

1. The information is carried by using the first RNTI in the response information in the foregoing embodiment. In other words, the form is the same as that in the method in the foregoing embodiment.

2. Alternatively, the information is carried in an independent field in the response information, for example, the independent first field and second field.

The UE receives the response information sent by the base station, and obtains, based on the common indication information that is used to feed back the HARQ acknowledgement information and that is carried in the DCI and the user-level information that is of the resource used to feed back the HARQ acknowledgement information and that is carried in the response information, the first time domain resource and the first frequency domain resource used by the user to feed back the HARQ acknowledgement information.

The common indication information used to feed back the HARQ acknowledgement information includes a common PUCCH resource indicator and a common PDSCH-to-HARQ_feedback timing indicator. The user-level information of the resource used to feed back the HARQ acknowledgement information includes a user-level PUCCH resource indicator and a user-level PDSCH-to-HARQ_feedback timing indicator.

A method for obtaining the first time domain resource and the first frequency domain resource by using the common indication information used to feed back the HARQ acknowledgement information and the user-level information of the resource used to feed back the HARQ acknowledgement information is as follows:

The UE obtains, based on the PUCCH resource indicator, the frequency domain resource (namely, the first frequency domain resource) used to feed back the HARQ acknowledgement information. For details, refer to a formula (30), and the formula (30) is the same as formula (11):

$$r_{PUCCH} = \left\lfloor \frac{2 \cdot n_{CCE,0}}{N_{CCE,0}} \right\rfloor + 2 \cdot \Delta_{PRI} \text{ or } r_{PUCCH} = \Delta_{PRI} \quad (30)$$

The PUCCH resource indicator is obtained based on the common indication information used to feed back the HARQ acknowledgement information and the user-level information of the resource used to feed back the HARQ acknowledgement information. $\Delta_{PRI}=\Delta_{PRI\_com}+\Delta_{PRI\_UE}$, $\Delta_{PRI\_com}$ is a value of a common PUCCH resource indicator field, and $\Delta_{PRI\_UE}$ is a value of a user-level PUCCH resource indicator field.

The UE obtains, based on the PDSCH-to-HARQ_feedback timing indicator, a time domain resource (namely, the first time domain resource) used to feed back the HARQ acknowledgement information. For details, refer to the formula (14)/(17), (15)/(18), or (16)/(19), or the formula (18)/(25), (19)/(26), (20)/(27), or (21)/(28), or formula (29). $n_B$ is a value that is in a preconfigured value set and that is obtained based on a value B of the PDSCH-to-HARQ_feedback timing indicator, $B=B_{com}+B_{UE}$, $B_{com}$ is a value of a common PDSCH-to-HARQ_feedback timing indicator field, and $B_{UE}$ is a value of the user-level PDSCH-to-HARQ_feedback timing indicator field.

It may be understood that the foregoing embodiments have respective focuses. For an implementation that is not described in detail in one of the embodiments, refer to other embodiments. Details are not described herein again. For example, for a specific implementation of the method shown in FIG. 8, refer to the descriptions of the method shown in FIG. 5. Further, the embodiments described in this specification may be independent solutions, or may be combined according to internal logic. All these solutions fall within the protection scope of this application.

It may be understood that in the foregoing method embodiments, the method and the operation that are implemented by the terminal device may also be implemented by a component (for example, a chip or a circuit) that can be used in the terminal device.

The following describes in detail a communications apparatus provided in the embodiments of this application.

Figure 9:
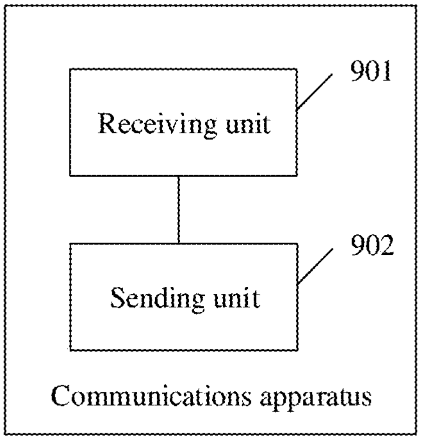
FIG. 9 is a schematic structural diagram of a communications apparatus according to an embodiment of this application.

FIG. 9 is a schematic structural diagram of a communications apparatus according to an embodiment of this application. The communications apparatus is configured to perform the method described in the embodiments of this application. As shown in FIG. 9, the communications apparatus includes the following units.

For example, the communications apparatus may be a terminal device, or may be a chip.

A receiving unit 901 is configured to receive a random access response from a network device, where the random access response includes a first radio network temporary identifier RNTI, the first RNTI includes a first field and a second field, the first field is used to indicate a first frequency domain resource, and the second field is used to indicate a first time domain resource.

A sending unit 902 is configured to send hybrid automatic repeat request HARQ acknowledgement information based on the first time domain resource and the first frequency domain resource.

For example, the communications apparatus may alternatively be a network device.

A receiving unit 901 is configured to receive a random access request from a terminal device.

A sending unit 902 is configured to send a random access response to the terminal device, where the random access response includes a first radio network temporary identifier RNTI, the first RNTI includes a first field and a second field, the first field is used to indicate a first frequency domain resource, the second field is used to indicate a first time domain resource, the first frequency domain resource and the first time domain resource are used to indicate a time-frequency resource for hybrid automatic repeat request HARQ acknowledgement information, and the HARQ acknowledgement information is used to feed back that the random access response is correctly received.

In a possible implementation, a value of the first RNTI is obtained based on an N-ary value corresponding to a bit length i of the first field and an N-ary value corresponding to a bit length j of the second field, and the N-ary value includes any one of a decimal value, an octal value, and a hexadecimal value.

In a possible implementation, the value of the first RNTI satisfies the following condition:

$$o < D_1 \le \text{First threshold, and } D_1 \ne D_2\text{; and}$$

$$D_1 = C*2^{i+j} + A*2^j + B \text{ or } D_1 = C*2^{i+j} + B*2^i + A,$$

$D_1$ is the value of the first RNTI, $D_2$ is a value of a second RNTI, i is the bit length of the first field, j is the bit length of the second field, A is a decimal value of i bits, B is a decimal value of j bits, C is a decimal value of k bits, i+j+k=L, and L is a bit length of the first RNTI.

In a possible implementation, the value of the first RNTI further satisfies the following condition:

$$\text{Second threshold} < D_1 \le \text{First threshold.}$$

In a possible implementation, the value of the first RNTI satisfies the following condition:

$$o < D_1 \le \text{First threshold, and } D_1 \ne D_2\text{; and}$$

$$D_1 = A*2^{j+k} + B*2^k + C \text{ or } D_1 = B*2^{i+k} + A*2^k + C,$$

$D_1$ is the value of the first RNTI, $D_2$ is a value of a second RNTI, i is the bit length of the first field, j is the bit length of the second field, A is a decimal value of i bits, B is a decimal value of j bits, C is a decimal value of k bits, i+j+k=L, and L is a bit length of the first RNTI.

In a possible implementation, a slot in which the terminal device sends the HARQ acknowledgement information to the network device satisfies the following condition:

$$n_{PUCCH} = n_{TA} + n_B\text{; or}$$

$$n_{PUCCH} = n + k_{TA} + n_B\text{; or}$$

$$n_{PUCCH} = \max\{n + n_B,\ n + k_{TA} + 1\},$$

where $n_{PUCCH}$ is the slot in which the terminal device sends the HARQ acknowledgement information, $n_{TA}$ is a slot in which a timing advance command takes effect, n is an uplink slot corresponding to the last symbol of a PDSCH, $k_{TA}$ is a TA adjustment parameter, the PDSCH carries the random access response, and $n_B$ is a specific value corresponding to an index B in a preconfigured value set.

In some embodiments of this application, when the communications apparatus shown in FIG. 9 is a terminal device or a chip of a terminal device, a receiving unit 901 is configured to receive a random access response from a network device, where the random access response includes indication information, and the indication information is used to indicate a first frequency domain resource and a first time domain resource.

A sending unit 902 is configured to send hybrid automatic repeat request HARQ acknowledgement information based on the first time domain resource and the first frequency domain resource, where a sending slot of the HARQ acknowledgement information is related to a slot in which a timing advance command takes effect.

In a possible implementation, the random access response further includes the timing advance command; and

- the indication information and the timing advance command are carried on a same physical downlink shared channel PDSCH; or
- the timing advance command is carried in downlink control information DCI, and the indication information is carried on a PDSCH scheduled by using the DCI; or
- the indication information and the timing advance command are carried in same DCI.

In a possible implementation, a slot in which the HARQ acknowledgement information is sent to the network device satisfies the following condition:

$$n_{PUCCH}=n_{TA}+n_B;\text{ or}$$

$$n_{PUCCH}=n+k_{TA}+n_B;\text{ or}$$

$$n_{PUCCH}=\max\{n+n_B,\ n+k_{TA}+1\},$$

where $n_{PUCCH}$ is the slot in which the terminal device sends the HARQ acknowledgement information, $n_{TA}$ is the slot in which the timing advance command takes effect, n is an uplink slot corresponding to the last symbol of a PDSCH, $k_{TA}$ is a TA adjustment parameter, $n_B$ is a specific value whose index is B in a preconfigured value set, and B is a specific value of a field indicating the first time domain resource.

In a possible implementation, the slot in which the timing advance command takes effect satisfies the following condition:

$$n_{TA\_update}=n+k_{TA}+\Delta;\text{ and}$$

a slot in which the HARQ acknowledgement information is sent to the network device satisfies the following condition:

$$n_{PUCCH}=n_{TA\_update}+n_B;\text{ or}$$

$$n_{PUCCH}=n+k_{TA}+n_B;\text{ or}$$

$$n_{PUCCH}=\max\{n+n_B,\ n_{TA\_update}\};\text{ or}$$

$$n_{PUCCH}=n+n_B,\text{ where}$$

$\Delta$ is a constant, $n_{PUCCH}$ is the slot in which the terminal device sends the HARQ acknowledgement information, $n_{TA\_update}$ is the slot in which the timing advance command takes effect, n is an uplink slot corresponding to the last symbol of a PDSCH, $k_{TA}$ is a TA adjustment parameter, $n_B$ is a specific value whose index is B in a preconfigured value set, and B is a specific value of a field indicating the first time domain resource.

It should be understood that, when the communications apparatus is the terminal device or a component that implements the foregoing function in the terminal device, the apparatus may further include a processing unit, which is not shown in FIG. 9. The processing unit may be one or more processors, the sending unit 902 may be a transmitter, and the receiving unit 901 may be a receiver. Alternatively, the sending unit 902 and the receiving unit 901 are integrated into one component, for example, a transceiver.

When the communications apparatus is the chip, the processing unit may be one or more processors, the sending unit 902 may be an output interface, and the receiving unit 901 may be an input interface. Alternatively, the sending unit 902 and the receiving unit 901 are integrated into one unit, for example, a transceiver unit. The transceiver unit may be an input/output interface, which is also referred to as a communications interface, an interface circuit, an interface, or the like.

It may be understood that, for implementation of the units shown in FIG. 9, refer to corresponding descriptions in the foregoing embodiments.

Figure 10:
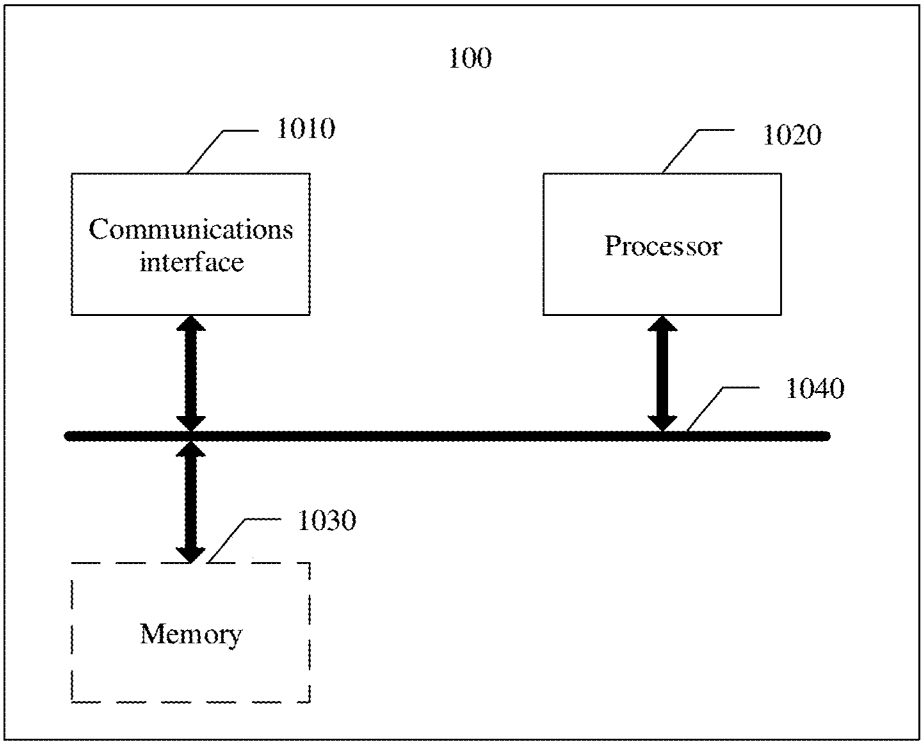
FIG. 10 is a schematic structural diagram of a terminal device according to an embodiment of this application.

FIG. 10 shows a communications apparatus 100 according to an embodiment of this application. The communications apparatus 100 is configured to implement a function of the terminal device in the foregoing method. When the function of the terminal device is implemented, the apparatus may be a terminal device, an apparatus in a terminal device, or an apparatus that can be used together with a terminal device. The apparatus may alternatively be a chip system. In this embodiment of this application, the chip system may include a chip, or may include a chip and another discrete component. The apparatus 100 includes at least one processor 1020, configured to implement the function of the terminal device in the method provided in the embodiments of this application. The apparatus 100 may further include a communications interface 1010. In this embodiment of this application, the communications interface may be a transceiver, a circuit, a bus, a module, or a communications interface of another type, and is configured to communicate with another device through a transmission medium. For example, the communications interface 1010 is used by an apparatus in the apparatus 100 to communicate with the another device. The processor 1020 receives and sends data through the communications interface 1010, and is configured to implement the method in the foregoing method embodiments.

The apparatus 100 may further include at least one memory 1030, configured to store program instructions and/or data. The memory 1030 is coupled to the processor 1020. The coupling in this embodiment of this application may be indirect coupling or a communication connection between apparatuses, units, or modules in an electrical form, a mechanical form, or another form, and is used for information exchange between the apparatuses, the units, or the modules. The processor 1020 may operate in collaboration with the memory 1030. The processor 1020 may execute the program instructions stored in the memory 1030. At least one of the at least one memory may be included in the processor.

In this embodiment of this application, a specific connection medium between the communications interface 1010, the processor 1020, and the memory 1030 is not limited. In this embodiment of this application, the memory 1030, the processor 1020, and the communications interface 1010 are connected through a bus 1040 in FIG. 10, and the bus is represented by a thick line in FIG. 10. A connection manner between other components is schematically described, and is not limited thereto. The bus may be classified into an address bus, a data bus, a control bus, and the like. For ease of representation, only one thick line is used to represent the bus in FIG. 10, but this does not mean that there is only one bus or only one type of bus.

When the apparatus 100 is specifically a chip or a chip system, the communications interface 1010 may output or receive a baseband signal. When the apparatus 100 is specifically a device, the communications interface 1010 may output or receive a radio frequency signal. In this embodiment of this application, the processor may be a general-purpose processor, a digital signal processor, an application-specific integrated circuit, a field programmable gate array or another programmable logic device, a discrete gate or a transistor logic device, or a discrete hardware component, and may implement or perform the methods, the steps, and logical block diagrams disclosed in the embodiments of this application. The general-purpose processor may be a microprocessor or any conventional processor or the like. The steps of the methods disclosed with reference to the embodiments of this application may be directly performed and completed by a hardware processor, or may be performed and completed by a combination of hardware and a software module in the processor.

Figure 11:
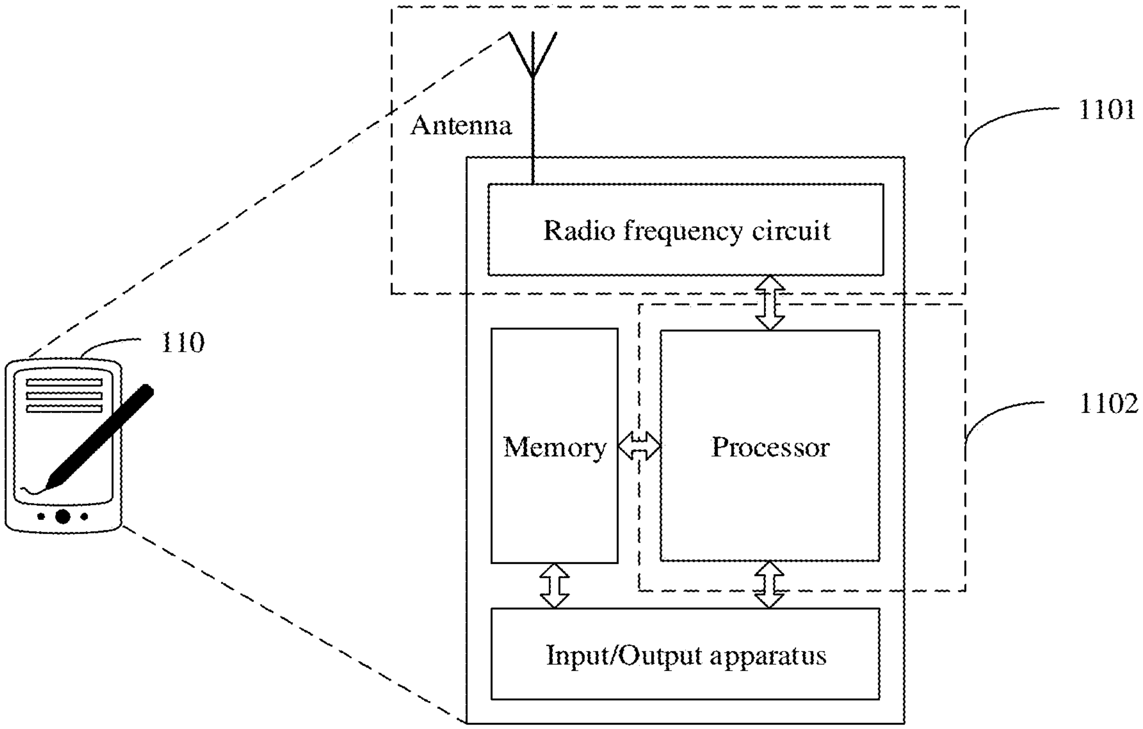
FIG. 11 is a schematic structural diagram of a terminal device according to an embodiment of this application.

In an example, FIG. 11 is a schematic structural diagram of a terminal device 110 according to an embodiment of this application. The terminal device may perform the methods shown in FIG. 5 and FIG. 8, or the terminal device may perform an operation of the terminal device shown in FIG. 9.

For ease of description, FIG. 11 shows only main components of the terminal device. As shown in FIG. 11, the terminal device 110 includes a processor, a memory, a radio frequency circuit, an antenna, and an input/output apparatus. The processor is mainly configured to: process a communication protocol and communication data, control the entire terminal device, execute a software program, and process data of the software program. For example, the processor is configured to support the terminal device in performing the procedures described in FIG. 5 and FIG. 8. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The terminal device 110 may further include the input/output apparatus, such as a touchscreen, a display screen, or a keyboard, and is mainly configured to receive data entered by a user and output data to the user. It should be noted that some types of terminal devices may have no input/output apparatus.

After the terminal device is powered on, the processor may read a software program in a storage unit, explain and execute instructions of the software program, and process data of the software program. When data needs to be sent in a wireless manner, after performing baseband processing on the to-be-sent data, the processor outputs a baseband signal to the radio frequency circuit. After performing radio frequency processing on the baseband signal, the radio frequency circuit sends a radio frequency signal in a form of an electromagnetic wave to the outside through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 11 shows only one memory and only one processor. In an actual terminal device, there may be a plurality of processors and a plurality of memories. The memory may also be referred to as a storage medium, a storage device, or the like. This is not limited in the embodiments of this application.

It should be noted that the processor in the embodiments of this application may be an integrated circuit chip, and has a signal processing capability. In an implementation process, the steps in the foregoing method embodiments may be implemented by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and accomplished by a hardware decoding processor, or may be performed and accomplished by a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with the hardware of the processor. In an optional implementation, the processor may include a baseband processor and a central processing unit (CPU). The baseband processor is mainly configured to process a communication protocol and communication data. The CPU is mainly configured to: control the entire terminal device, execute a software program, and process data of the software program. Optionally, the processor may alternatively be a network processor (NP) or a combination of a CPU and an NP. The processor may further include a hardware chip. The hardware chip may be an application-specific integrated circuit (ASIC), a programmable logic device (programmable logic device, PLD), or a combination thereof. The PLD may be a complex programmable logic device (CPLD), a field programmable gate array (FPGA), generic array logic (GAL), or any combination thereof. The memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example descriptions rather than limitative descriptions, RAMs in many forms may be available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memories in the systems and methods described in this specification include but are not limited to these memories and any memory of another proper type.

For example, in the embodiments of this application, the antenna and the radio frequency circuit that have a transceiver function may be considered as a transceiver unit 1101 of the terminal device 110, and the processor having a processing function may be considered as a processing unit 1102 of the terminal device 110.

As shown in FIG. 11, the terminal device 110 may include the transceiver unit 1101 and the processing unit 1102. The transceiver unit may also be referred to as a transceiver, a transceiver machine, a transceiver apparatus, or the like. Optionally, a component that is in the transceiver unit 1101 and that is configured to implement a receiving function may be considered as a receiving unit, and a component that is in the transceiver unit 1101 and that is configured to implement a sending function may be considered as a sending unit. In other words, the transceiver unit 1101 includes the receiving unit and the sending unit. For example, the receiving unit may also be referred to as a receiver machine, a receiver, a receiver circuit, or the like, and the sending unit may be referred to as a transmitter machine, a transmitter, a transmit circuit, or the like.

In some embodiments, the transceiver unit 1101 and the processing unit 1102 may be integrated into one component, or may be separated into different components. In addition, the processor and the memory may be integrated into one component, or may be separated into different components.

For example, the transceiver unit 1101 may be configured to perform the method shown in FIG. 6. For another example, the transceiver unit 1101 may be configured to perform the method shown in FIG. 8.

Figure 12:
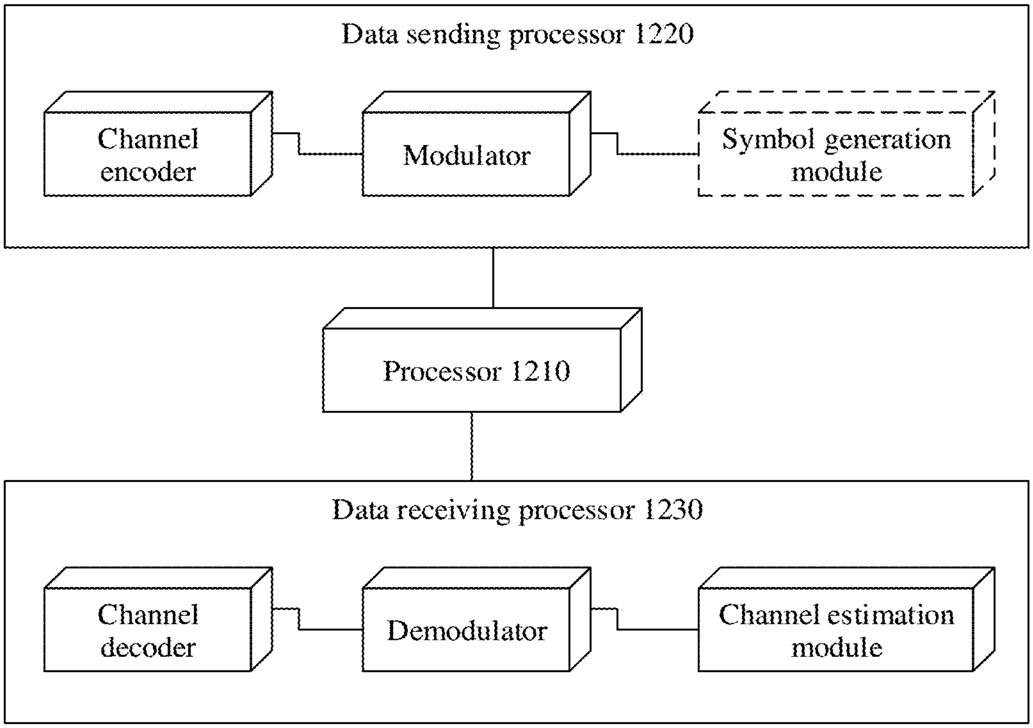
FIG. 12 is a schematic structural diagram of a terminal device according to an embodiment of this application.

When the communications apparatus in this embodiment of this application is a terminal device, further refer to a device shown in FIG. 12. The device includes a processor 1212, a data sending processor 1220, and a data receiving processor 1230. The processing unit 701 in the foregoing embodiment may be the processor 1212 in FIG. 12, and implements a corresponding function. The receiving unit in the foregoing embodiment may be the data receiving processor 1230 in FIG. 12, and the sending unit may be the data sending processor 1220 in FIG. 12. Although FIG. 12 shows a channel encoder and a channel decoder, it may be understood that the modules are merely examples, and do not constitute a limitation on this embodiment.

It may be understood that for an implementation of the terminal device in this embodiment of this application, refer to the foregoing embodiments. Details are not described herein again.

Figure 13:
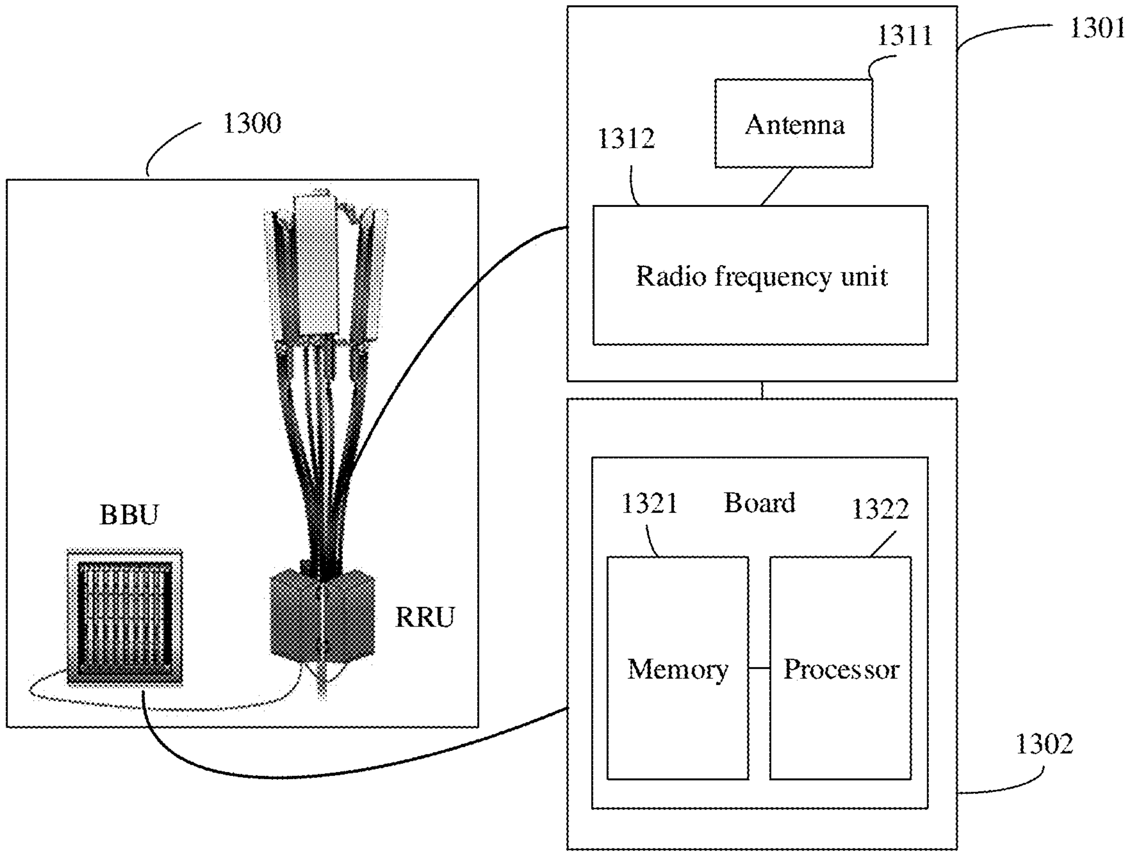
FIG. 13 is a schematic structural diagram of a network device according to an embodiment of this application.

FIG. 13 is a schematic structural diagram of a network device 1300 according to an embodiment of this application. The network device may perform operations of the network device in the methods shown in FIG. 6 and FIG. 8, or the network device may perform operations when the communications apparatus shown in FIG. 9 is a network device.

The network device 1300 includes one or more remote radio units (remote radio unit, RRU) 1301 and one or more baseband units (BBU) 1302. The RRU 1301 may be referred to as a transceiver unit, a transceiver machine, a transceiver circuit, a transceiver, or the like, and may include at least one antenna 1313 and a radio frequency unit 1313. The RRU 1301 is mainly configured to: receive and send a radio frequency signal, and perform conversion between the radio frequency signal and a baseband signal. The BBU 1302 is mainly configured to: perform baseband processing, control the network device, and so on. The RRU 1301 and the BBU 1302 may be physically disposed together, or may be physically disposed separately, that is, in a distributed network device.

The BBU 1302 is a control center of the network device, may also be referred to as a processing unit, and is mainly configured to complete baseband processing functions such as channel coding, multiplexing, modulation, and spectrum spreading.

In an example, the BBU 1302 may include one or more boards, and a plurality of boards may jointly support a radio access network (such as an LTE network) in a single access standard, or may separately support radio access networks in different access standards. The BBU 1302 further includes a memory 1321 and a processor 1322. The memory 1321 is configured to store a necessary message and necessary data. The processor 1322 is configured to control the network device to perform a necessary action, for example, control the network device to perform a corresponding operation shown in FIG. 13. The memory 1321 and the processor 1322 may serve one or more boards. In other words, a memory and a processor may be independently disposed on each board. Alternatively, a plurality of boards may share a same memory and processor. In addition, a necessary circuit is further disposed on each board. Optionally, the processor may be a CPU, an NP, or a combination of a CPU and an NP. The processor may further include a hardware chip. The hardware chip may be an ASIC, a PLD, or a combination thereof. The PLD may be a CPLD, an FPGA, GAL, or any combination thereof. The memory may include a volatile memory such as a RAM; the memory may include a nonvolatile memory such as a flash memory, a hard disk drive, or a solid-state drive; or the memory may include a combination of the foregoing types of memories.

It may be understood that for an implementation of the network device in this embodiment of this application, refer to the foregoing embodiments. Details are not described herein again.

It may be understood that the network device shown in FIG. 13 is merely an example. During specific implementation, there may be another type of network device. Therefore, the network device shown in FIG. 13 should not be understood as a limitation on this embodiment of this application.

It may be understood that, according to the methods provided in the embodiments of this application, this application further provides a computer program product. The computer program product includes computer program code. When the computer program code is run on a computer, the computer is enabled to perform the method in the embodiment shown in FIG. 5 or FIG. 8. Further, the computer may be enabled to perform, based on scenarios provided in the embodiments of this application, the method shown in FIG. 5 or FIG. 8.

According to the methods provided in the embodiments of this application, this application further provides a computer-readable medium. The computer-readable medium stores program code. When the program code is run on a computer, the computer is enabled to perform the method in the embodiment shown in FIG. 5 or FIG. 8. Further, the computer may be enabled to perform, based on scenarios provided in the embodiments of this application, the method shown in FIG. 5 or FIG. 8.

According to the methods provided in the embodiments of this application, this application further provides a system, including the foregoing terminal device and the foregoing network device. The terminal device may be configured to perform the method provided in the embodiment of this application and shown in FIG. 5 or FIG. 8. The network device may also be configured to perform the method provided in the embodiments of this application shown in FIG. 5 or FIG. 8.

All or some of the foregoing embodiments may be implemented by using software, hardware, firmware, or any combination thereof. When software is used to implement the embodiments, the embodiments may be implemented all or partially in a form of a computer program product. The computer program product includes one or more computer instructions. When the computer instructions are loaded and executed on a computer, the procedures or the functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (solid state disc, SSD)), or the like.

A person of ordinary skill in the art may be aware that illustrative logical blocks and steps (step) described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

receiving, by a terminal device, a physical downlink shared channel (PDSCH) that carries a random access response, wherein the random access response comprises a physical uplink control channel (PUCCH) resource indicator and a PDSCH-to-hybrid automatic repeat request (HARQ) feedback (PDSCH-to-HARQ_feedback) timing indicator, wherein the PUCCH resource indicator is associated with determination of a frequency domain resource for feeding back HARQ acknowledgement information, wherein the PDSCH-to-HARQ_feedback timing indicator is associated with determination of a time domain resource for feeding back the HARQ acknowledgement information, and wherein the random access response includes a radio network temporary identifier (RNTI) indicating the frequency domain resource and the time domain resource; and sending, by the terminal device, the HARQ acknowledgement information on the frequency domain resource and the time domain resource, wherein a sending slot of the HARQ acknowledgement information is related to an uplink slot corresponding to a last symbol of the PDSCH, an offset indicated by the PDSCH-to-HARQ_feedback timing indicator, and a value that is associated with a subcarrier spacing;

wherein the sending slot of the HARQ acknowledgement information satisfies:

$$n_{PUCCH} = n + n_B + \Delta RAR$$

wherein $n_{PUCCH}$ is the slot in which the terminal device sends the HARQ acknowledgement information, wherein n is the uplink slot corresponding to the last symbol of the PDSCH, wherein nB is the offset indicated by the PDSCH-to-HARQ feedback timing indicator, and wherein ΔRAR is the value associated with the subcarrier spacing.

2. The method according to claim 1, wherein a relationship between $\Delta_{RAR}$ and the subcarrier spacing μ is selected from:

| μ | $\Delta_{RAR}$ |
|---|---|
| 0 | 2 |
| 1 | 3 |
| 2 | 4 |
| 3 | 6. |

3. The method according to claim 1, wherein the RNTI comprises a first field comprising the PUCCH resource indicator, and further comprises a second field comprising the PDSCH-to-HARQ_feedback timing indicator.

4. A method, comprising:

sending, by a network device, a physical downlink shared channel (PDSCH) that carries a random access response, wherein the random access response comprises a physical uplink control channel (PUCCH) resource indicator and a PDSCH-to-hybrid automatic repeat request (HARQ) feedback (PDSCH-to-HARQ_feedback) timing indicator, wherein the PUCCH resource indicator is associated with determination of a frequency domain resource for feeding back HARQ acknowledgement information, wherein the PDSCH-to-HARQ_feedback timing indicator is associated with determination of a time domain resource for feeding back the HARQ acknowledgement information, and wherein the random access response includes a radio network temporary identifier (RNTI) indicating the frequency domain resource and the time domain resource; and receiving, by the network device, the HARQ acknowledgement information on the frequency domain resource and the time domain resource, wherein a sending slot of the HARQ acknowledgement information is related to an uplink slot corresponding to a last symbol of the PDSCH, an offset indicated by the PDSCH-to-HARQ_feedback timing indicator, and a value that is associated with a subcarrier spacing;

wherein the sending slot of the HARQ acknowledgement information satisfies:

$$n_{PUCCH} = n + n_B + \Delta RAR$$

wherein $n_{PUCCH}$ is the slot in which a terminal device sends the HARQ acknowledgement information, wherein n is the uplink slot corresponding to the last symbol of the PDSCH, wherein ng is the offset indicated by the PDSCH-to-HARQ feedback timing indicator, and wherein ΔRAR is the value that is associated with the subcarrier spacing.

5. The method according to claim 4, wherein a relationship between $\Delta_{RAR}$ and the subcarrier spacing μ is selected from:

| μ | $\Delta_{RAR}$ |
|---|---|
| 0 | 2 |
| 1 | 3 |
| 2 | 4 |
| 3 | 6. |

6. The method according to claim 4, wherein the RNTI comprises a first field comprising the PUCCH resource indicator, and further comprises a second field comprising the PDSCH-to-HARQ_feedback timing indicator.

7. A terminal device, comprising:

a transceiver;

one or more processors; and a non-transitory computer-readable storage medium storing a program to be executed by the one or more processors, the program including instructions to:

receive a physical downlink shared channel (PDSCH) that carries a random access response, wherein the random access response comprises a physical uplink control channel (PUCCH) resource indicator and a PDSCH-to-hybrid automatic repeat request (HARQ) feedback (PDSCH-to-HARQ_feedback) timing indicator, wherein the PUCCH resource indicator is associated with determination of a frequency domain resource for feeding back HARQ acknowledgement information, wherein the PDSCH-to-HARQ_feedback timing indicator is associated with determination of a time domain resource for feeding back HARQ acknowledgement information, and wherein the random access response includes a radio network temporary identifier (RNTI) indicating the frequency domain resource and the time domain resource; and send the HARQ acknowledgement information on the frequency domain resource and the time domain resource, wherein a sending slot of the HARQ acknowledgement information is related to an uplink slot corresponding to a last symbol of the PDSCH, an offset indicated by the PDSCH-to-HARQ_feedback timing indicator, and a value that is associated with a subcarrier spacing;

wherein the sending slot of the HARQ acknowledgement information satisfies:

$$n_{PUCCH} = n + n_B + \Delta RAR$$

wherein $n_{PUCCH}$ is the slot in which the terminal device sends the HARQ acknowledgement information, wherein n is an uplink slot corresponding to the last symbol of the PDSCH, wherein np is the offset indicated by the PDSCH-to-HARQ feedback timing indicator, and wherein ΔRAR is the value that is associated with a subcarrier spacing.

8. The terminal device according to claim 7, wherein a relationship between $\Delta_{RAR}$ and the subcarrier spacing μ selected from:

| μ | $\Delta_{RAR}$ |
|---|---|
| 0 | 2 |
| 1 | 3 |
| 2 | 4 |
| 3 | 6. |

9. The terminal device according to claim 7, wherein the RNTI comprises a first field comprising the PUCCH resource indicator, and further comprises a second field comprising the PDSCH-to-HARQ_feedback timing indicator.

10. A network device, comprising:

a transceiver;

one or more processors; and a non-transitory computer-readable storage medium storing a program to be executed by the one or more processors, the program including instructions to:

send a physical downlink shared channel (PDSCH) that carries a random access response, wherein the random access response comprises a physical uplink control channel (PUCCH) resource indicator and a PDSCH-to-hybrid automatic repeat request (HARQ) feedback (PDSCH-to-HARQ_feedback) timing indicator, wherein the PUCCH resource indicator is associated with determination of a frequency domain resource for feeding back HARQ acknowledgement information, wherein the PDSCH-to-HARQ_feedback timing indicator is associated with determination of a time domain resource for feeding back the HARQ acknowledgement information, and wherein the random access response includes a radio network temporary identifier (RNTI) indicating the frequency domain resource and the time domain resource; and receive the HARQ acknowledgement information on the frequency domain resource and the time domain resource, wherein a sending slot of the HARQ acknowledgement information is related to an uplink slot corresponding to a last symbol of the PDSCH, an offset indicated by the PDSCH-to-HARQ_feedback timing indicator, and a value that is associated with a subcarrier spacing;

wherein the sending slot of the HARQ acknowledgement information satisfies:

$$n_{PUCCH} = n + n_B + \Delta RAR$$

wherein $n_{PUCCH}$ is the slot in which a terminal device sends the HARQ acknowledgement information, wherein n is an uplink slot corresponding to the last symbol of the PDSCH, wherein np is the offset indicated by the PDSCH-to-HARQ feedback timing indicator, and wherein ΔRAR is the value that is associated with a subcarrier spacing.

11. The network device according to claim 10, wherein a relationship between $\Delta_{RAR}$ and the subcarrier spacing μ is selected from:

| μ | $\Delta_{RAR}$ |
|---|---|
| 0 | 2 |
| 1 | 3 |
| 2 | 4 |
| 3 | 6. |

12. The network device according to claim 10, wherein the RNTI comprises a first field comprising the PUCCH resource indicator, and further comprises a second field comprising the PDSCH-to-HARQ_feedback timing indicator.

* * * * *